(12) United States Patent
Takagi

(10) Patent No.: US 7,412,270 B2
(45) Date of Patent: Aug. 12, 2008

(54) MULTIFUNCTIONAL MOBILE RADIO COMMUNICATION APPARATUS

(75) Inventor: Hisamitsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 11/267,304

(22) Filed: Nov. 7, 2005

(65) Prior Publication Data

US 2006/0080805 A1 Apr. 20, 2006

Related U.S. Application Data

(63) Continuation of application No. PCT/JP03/09580, filed on Jul. 28, 2003.

(51) Int. Cl.
 *H04M 1/00* (2006.01)
(52) U.S. Cl. ............... 455/575.1; 455/550.1; 455/90.3; 455/575.3; 16/54; 16/325; 16/371; 379/428.01; 379/433.06; 379/433.13; 439/31; 439/164; 439/165
(58) Field of Classification Search ................. 455/90, 455/550.1, 575.1, 575.3, 128, 90.3, 90.1; 16/54, 342, 325, 368, 348, 371; 379/428.01–440; 439/31, 164, 165
See application file for complete search history.

(56) References Cited

U.S. PATENT DOCUMENTS

| 5,636,275 | A | | 6/1997 | Takagi et al. |
| 5,697,124 | A | | 12/1997 | Jung |
| 5,905,796 | A | | 5/1999 | Jung |
| 6,831,229 | B1 | * | 12/2004 | Maatta et al. ................. 174/66 |
| 2002/0173281 | A1 | | 11/2002 | Kobayashi |
| 2004/0002241 | A1 | * | 1/2004 | Lee ............................. 439/165 |
| 2004/0048633 | A1 | * | 3/2004 | Sato et al. ................. 455/556.1 |
| 2004/0211036 | A1 | * | 10/2004 | Park et al. ..................... 16/348 |
| 2006/0050867 | A1 | * | 3/2006 | Kawamoto ............. 379/433.13 |
| 2006/0137142 | A1 | * | 6/2006 | Qin et al. ....................... 16/342 |
| 2006/0265838 | A1 | * | 11/2006 | Duan et al. .................... 16/325 |
| 2007/0123064 | A1 | * | 5/2007 | Shinoda ....................... 439/31 |
| 2007/0123078 | A1 | * | 5/2007 | Yada et al. ................... 439/164 |
| 2007/0149260 | A1 | * | 6/2007 | Satoh et al. .............. 455/575.1 |

FOREIGN PATENT DOCUMENTS

| JP | 5-336022 | 12/1993 |
| JP | 6-268724 | 9/1994 |
| JP | 8-186629 | 7/1996 |

(Continued)

*Primary Examiner*—Sujatha Sharma
(74) *Attorney, Agent, or Firm*—Westerman, Hattori, Daniels & Adrian, LLP.

(57) ABSTRACT

A mobile radio communication apparatus includes a first housing, a second housing, a hinge part that foldably connects the second housing to the first housing, a one touch opening mechanism that is provided to the hinge part, and automatically opens the second housing from a folded state to an angle between 160° and 170° relative to the first housing in a non-stop motion, a damper mechanism that is provided to the hinge part and brakes an opening action of the second housing by the one touch opening mechanism, the damper mechanism including a damper having a rotational shaft that generates a braking power and a damper bush having a fixed shaft connected to the rotational shaft, and a flexible printed circuit that is twisted around the rotational or fixed shaft of the damper mechanism, and electrically connects the first and second housings to each other.

7 Claims, 39 Drawing Sheets

FOREIGN PATENT DOCUMENTS

| | | |
|---|---|---|
| JP | 8-331219 | 12/1996 |
| JP | 9-130462 | 5/1997 |
| JP | 10-051526 | 2/1998 |
| JP | 10-51526 | 2/1998 |
| JP | 11-163986 | 6/1999 |
| JP | 2002-70400 | 3/2002 |
| JP | 2002-139020 | 5/2002 |
| JP | 2002-344897 | 11/2002 |
| JP | 2002-364629 | 12/2002 |
| JP | 2003-65320 | 3/2003 |
| JP | 2003-161312 | 6/2003 |

\* cited by examiner

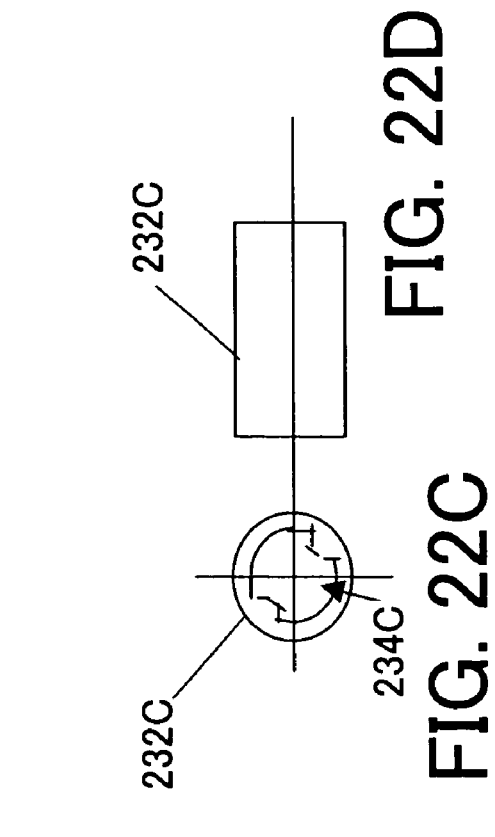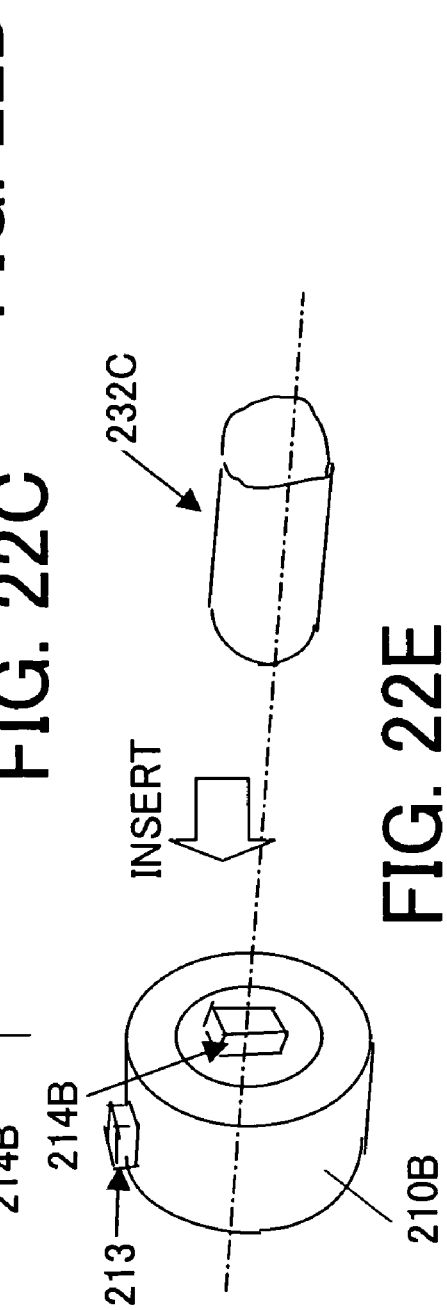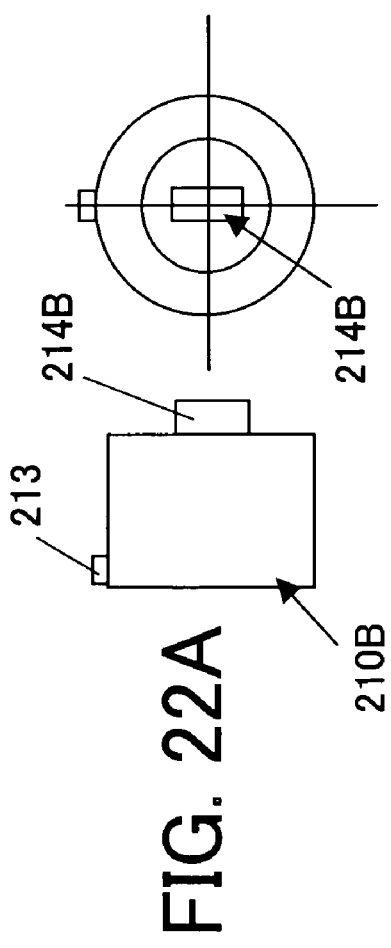

MULTIFUNCTIONAL MOBILE RADIO COMMUNICATION APPARATUS

This application is a continuation based on International Patent Application No. PCT/JP03/09580, filed on Jul. 28, 2003, which is hereby incorporated by reference herein in its entirety as if fully set forth herein.

BACKGROUND OF THE INVENTION

The present invention relates generally to a foldable portable phone (which includes a personal digital cellular ("PDC") and a personal handy phone system ("PHS")), and another mobile communication terminal, which are generically referred to as "mobile radio communication apparatus" in the instant application, and more particularly to an internal structure of its hinge part.

Recent widespread mobile radio communication apparatuses, such as PDCs, have roused various demands including operational comfortableness and safety, apparatus's versatility and smaller housing, etc. in addition to mere communications.

In general, there are two types of portable phones, i.e., foldable portable phones and non-foldable, rod-shaped portable phones. The foldable portable phones typically include a movable part that contains a liquid crystal display ("LCD") screen, a fixed part that contains a ten-key, and a hinge part that connects them foldably. Some foldable portable phones include a free stop function, a one touch opening function, and a safety-improving oil damper (see, for example, Japanese Patent Applications Publications Nos. 2002-344597, 2002-364629, 2002-139020, 10-51526, 9-130462, 8-331219, 8-186629, 6-268724, and 5-336022, and Japanese Utility-Model Registration No. 3,088,332). For the apparatus's versatility, the camera function and Internet access function that allows a user to access the Internet to download Web information and motion-picture information.

The free stop function is one that maintains an arbitrary angle between the movable part and the fixed part. The one touch opening function is one that automatically opens the movable part when a push button on the fixed part is pressed. The oil damper is such a damper as stores oil in a hinge part's case, and uses oil's viscosity to absorb vibrations when the movable part opens.

However, these conventional portable phones do not provide a satisfactorily user-friendly, safe, and small hinge mechanism.

BRIEF SUMMARY OF THE INVENTION

Accordingly, it is an exemplified object of the present invention to provide a mobile radio communication apparatus that has a satisfactorily user-friendly, safe, and small hinge mechanism.

A mobile radio communication apparatus according to one aspect of the present invention includes a first housing including an input part, a second housing including a speaker and a display, a hinge part that connects the second housing to the first housing so that the second housing can be folded over the first housing, a one touch opening mechanism that is provided to the hinge part, and automatically opens the second housing from a folded state to a first angle between 160° and 170° relative to the first housing in a non-stop motion, a damper mechanism that is provided to the hinge part and brakes an opening action of the second housing by the one touch opening mechanism, the damper mechanism including a damper and a damper bush, the damper having a rotational shaft that generates a braking power, and a damper bush having a fixed shaft connected to the rotational shaft, and a flexible printed circuit that is twisted around the rotational or fixed shaft of the damper mechanism, and electrically connects the first and second housings to each other. This mobile radio communication apparatus improves not only the operability to calls since the one touch opening mechanism opens the second housing to the best call angle, but also the safety of the opening action since the damper mechanism brakes the opening speed in the one touch opening. The damper mechanism stably supports the flexible printed circuit by twisting it, achieving the multi-functionality. The damper is, for example, an oil damper that generates the braking power when an agitator agitates oil around the rotational shaft.

A mobile radio communication apparatus according to another aspect of the present invention includes a first housing including an input part, a second housing including a speaker and a display, a hinge part that connects the second housing to the first housing so that the second housing can be folded over the first housing, a one touch opening mechanism that is provided to the hinge part, and automatically opens the second housing from a folded state to a first angle between 160° and 170° relative to the first housing in a non-stop motion, and a damper mechanism that is provided to the hinge part and brakes an opening action of the second housing by the one touch opening mechanism, wherein the damper mechanism includes a damper that has a rotational shaft, the rotational shaft generating a braking power, and serving as a rotational shaft of the hinge part. This mobile radio communication apparatus improves not only the operability to calls since the one touch opening mechanism opens the second housing to the best call angle, but also the safety of the opening action since the damper mechanism brakes the opening speed in the one touch opening. The damper's shaft serves as the rotational shaft of the hinge part, achieving the multi-functionality.

The hinge part may have a five-part structure that includes three first projections provided to the first housing, and two second projections provided to the second housing and among the first projections, wherein the mobile radio communication apparatus may further includes a flexible printed circuit that passes a middle of the three first projections and the second projection, and electrically connects the first and second housings to each other.

A mobile radio communication apparatus according to another aspect of the present invention includes a first housing including an input part, a second housing including a speaker and a display, a hinge part that connects the second housing to the first housing so that the second housing can be folded over the first housing, a one touch opening mechanism that is provided to the hinge part, and automatically opens the second housing from a folded state to a first angle between 160° and 170° relative to the first housing in a non-stop motion, a damper mechanism that is provided to the hinge part and brakes an opening action of the second housing by the one touch opening mechanism, the damper mechanism including a damper and a hollow damper bush, the damper having a rotational shaft that generates a braking power, and a damper bush having an engagement part engageable with the rotational shaft of the damper, and a flexible printed circuit that passes through a hollow in the damper bush, and electrically connects the first and second housings to each other. This mobile radio communication apparatus improves not only the operability to calls since the one touch opening mechanism opens the second housing to the best call angle, but also the safety of the opening action since the damper mechanism brakes the opening speed in the one touch opening. The damper bush serves as a housing that accommodates the flexible printed circuit, achieving the multi-functionality.

The mobile radio communication apparatus may further include a free stop mechanism that maintains the second housing relative to the first housing at a second angle, wherein the one touch opening mechanism, the damper mechanism and the free stop mechanism may be provided to the hinge part. Since the free stop mechanism can fix the second housing at the second angle, such as one between 20° and 140° and one between 90° and 140°, the operability to an application other than a call improves. The hinge part has plural functions, and promotes the miniaturization.

A mobile radio communication apparatus according to another aspect of the present invention includes a first housing including an input part, a second housing including a speaker and a display, a hinge part that connects the second housing to the first housing so that the second housing can be folded over the first housing, a one touch opening mechanism that automatically opens the second housing from a folded state to a first angle between 160° and 170° relative to the first housing in a non-stop motion, a free stop mechanism that is provided to the hinge part at a side of the second housing and maintains the second housing relative to the first housing at a second angle, and a damper mechanism that is provided to the hinge part at a side of the second housing and brakes an opening action of the second housing by the one touch opening mechanism, wherein the one touch opening mechanism includes a cam that is provided to the hinge part at a side of the second housing, is fixed onto the first housing, and has an inclined surface, a moving member that is provided to the hinge part at a side of the second housing, supported on the inclined surface of the cam, and forced to move and rotate along the inclined surface, a push button that is provided to the hinge part at a side of the first housing, an engagement member that is provided to the hinge part at a side of the second housing, and engaged with the cam so that the engagement member can be disengaged with the cam by the push button, and a restricting member that is provided to the hinge part at a side of the second housing, is engaged with the engagement member, and prevents the moving member from moving along the inclined surface of the cam, the restricting member rotating with the moving member when the push button releases an engagement between the engagement member and the cam. This mobile radio communication apparatus improves not only the operability to calls since the one touch opening mechanism opens the second housing to the best call angle, but also the safety of the opening action since the damper mechanism brakes the opening speed in the one touch opening. Since the free stop mechanism can fix the second housing at the second angle, such as one between 20° and 140° and one between 90° and 140°, the operability to an application other than a call improves. The hinge part (mainly at the second housing side) has plural functions, and promotes the miniaturization.

A hinge unit according to another aspect of the present invention for a mobile radio communication apparatus that includes the above first housing, the second housing, and the above flexible printed circuit connects the second housing to the first housing so that the second housing can be folded over the first housing and includes the above one touch opening mechanism, and the above damper mechanism, wherein the above flexible printed circuit is twisted around the rotational or fixed shaft of the damper mechanism.

Other objects and further features of the present invention will become readily apparent from the following description of preferred embodiments with reference to the accompanying drawings.

BRIEF DESCRIPTION OF THE DRAWINGS

FIG. 22A is a schematic side view of the damper shown in FIG. 4. FIG. 22B is a schematic front view of FIG. 22B. FIG. 22C is a schematic front view of a shaft of a damper bush shown in FIG. 21. FIG. 22D is a schematic side view of the shaft of a damper bush shown in FIG. 21. FIG. 22E is a schematic perspective view for explaining a connection between the damper shown in FIG. 22A and the shaft shown in FIG. 22D.

DETAILED DESCRIPTION OF THE PREFERRED EMBODIMENTS

Figure 2:
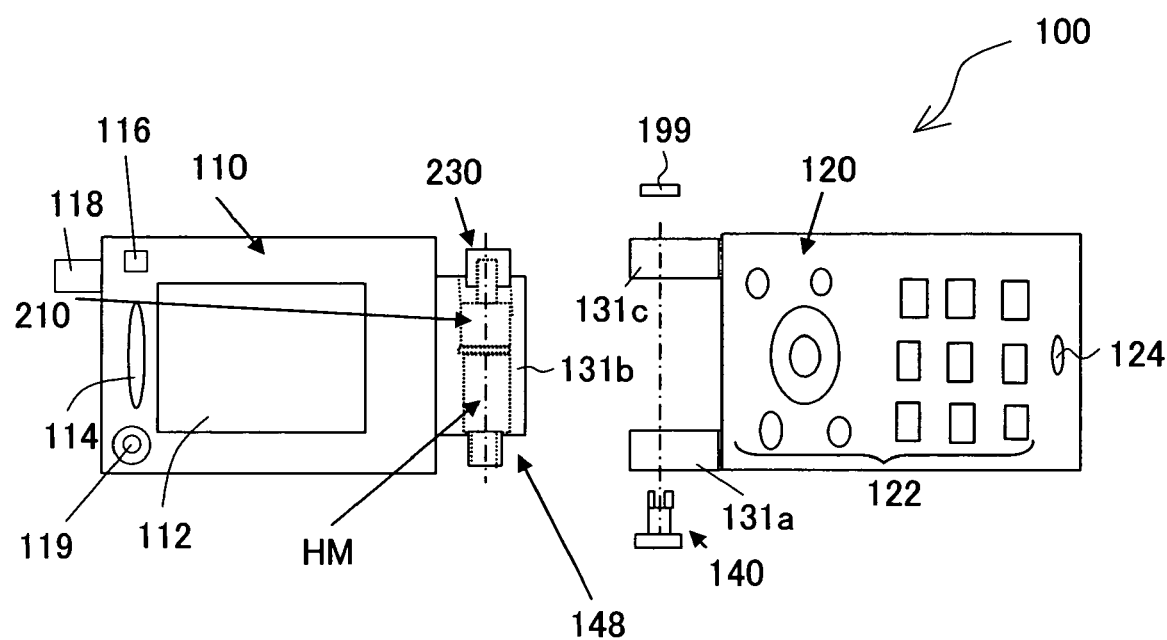
FIG. 2 is an exploded plane view of a hinge part having a trichotomous structure in the portable phone shown in FIG. 1.
Figure 3:
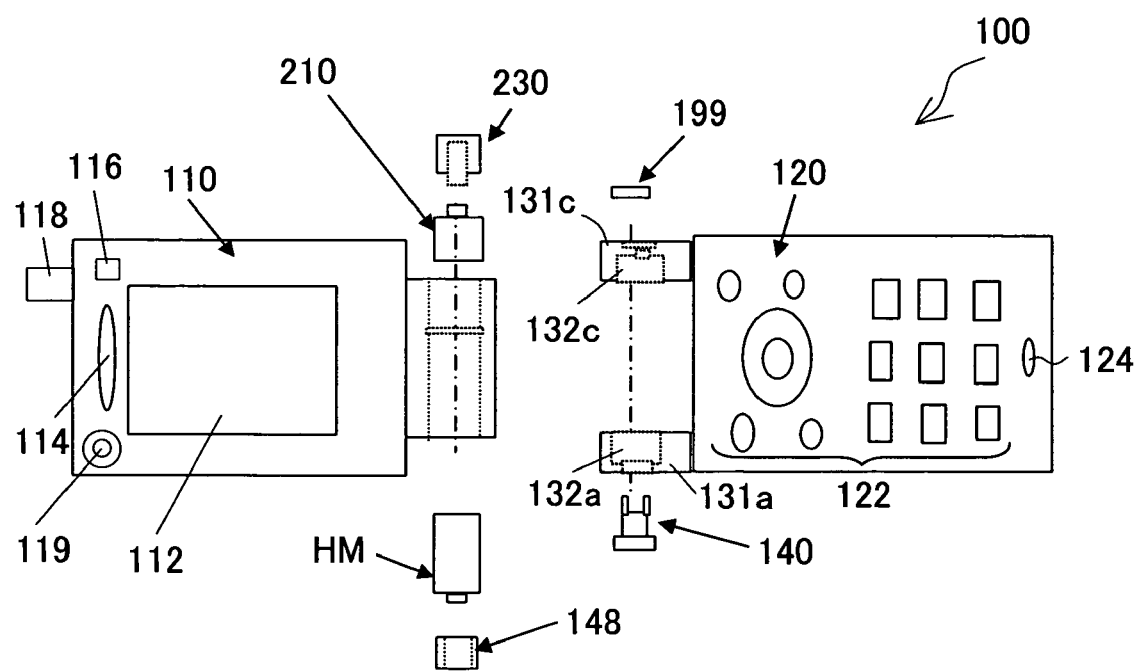
FIG. 3 is an exploded plane view of the hinge part shown in FIG. 2.

A description will be given of a PDC 100 as an exemplary mobile radio communication apparatus ("MRCA") as one embodiment according to the present invention, with reference to the accompanying drawings. Here, FIG. 1A is a plane view of the PDC 100, FIGS. 2 and 3 are schematic exploded plane view of a hinge part 130 in the PDC 100.

Figure 1:
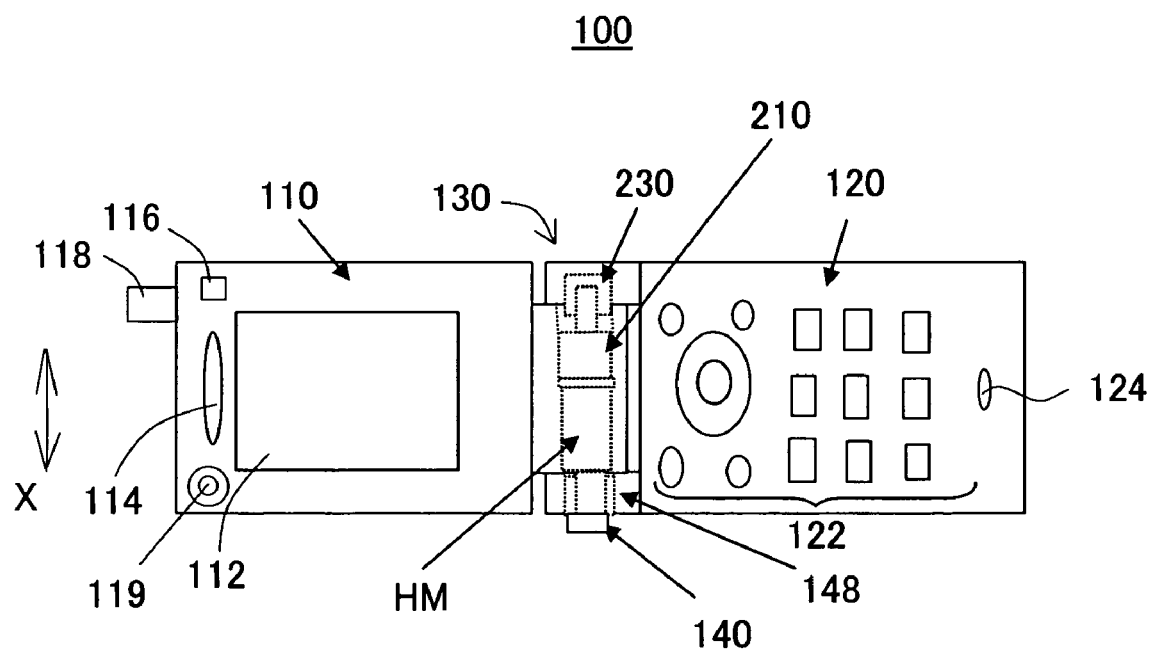
FIG. 1 is a plane view of a portable phone of as an exemplary mobile radio communication apparatus of one embodiment according to the present invention.

The PDC 100 roughly includes, as shown in FIG. 1, a movable-side housing 110, a fixed-side housing 120, and a hinge part 130. The hinge part 130 includes a one touch opening mechanism, a damper part, and a free stop mechanism. The PDC 100 is a foldable portable phone that folds the movable-side housing 110 over and opens the movable-side housing 110 from the fixed-side housing 120 through the hinge part 130.

The movable-side housing 110 includes a LCD screen (or a display) 112, a speaker 114, an LED 116, an antenna 118, and a lens 119. The LCD screen 112 indicates date and time, calling and called parties' numbers, battery residue, radio-wave strength mark, an out-of-range mark, and various functions. The speaker 114 outputs communicatee's voices and various functions' sounds or voices. The LED 116 indicates various statuses of the PDC 100, such as an incoming call and charging. The antenna 118 is extendable and used to communicate with base or other stations. The lens 119 provides a PDC with a camera function (such as a video camera and/or a still camera), and can be located on a rear surface or another surface of the movable-side housing 110 shown in FIG. 1. The PDC 100 of the instant embodiment can access the Internet through an access point. Each of these components 112 to 119 can use any technology known in the art, and a detailed description thereof will be omitted.

The movable-side housing 120 includes a ten-key 122 and a microphone 124. The ten-key 122 includes not only the ten-key for entries of communicatees' telephone numbers, but also input part of various symbols, alphabets, function keys (such as buttons and controllers), a power on/off part, etc. The microphone 124 receives user's audio inputs. The ten-key 122 and microphone 124 can also use any technology known in the art, and a detailed description thereof will be omitted.

The hinge part 130 foldably connects the movable-side housing 110 to the fixed-side housing 120, and has a dividable structure. The hinge structure of the instant embodiment has, but not limited to, a trichotomic or three-part structure, and may have a pentamerous or five-part structure, as described later. The hinge part 130 apparently has, as shown in FIGS. 2 and 3, a pair of convexes 131a and 131c at both sides of the fixed-side housing 120, and a convex 131b provided between the pair of convexes. FIG. 2 is a partial transparent view of a convex 132's structure in the movable-side housing 110 separated from the fixed-side hosing 120. FIG. 3 is a schematic exploded plane view of the convex 132's structure in the movable-side housing 110.

Figure 5:
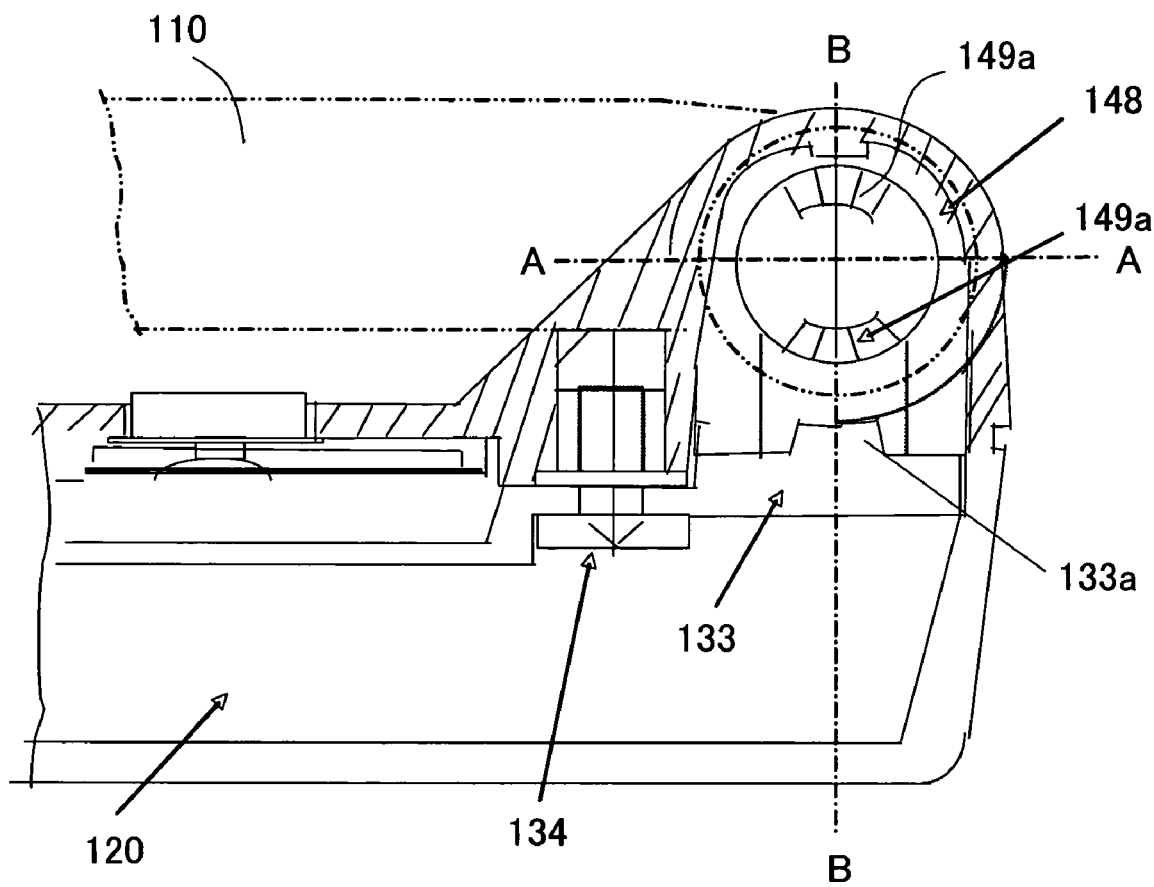
FIG. 5 is a schematic sectional view showing a bush attached to the hinged part.
Figure 15:
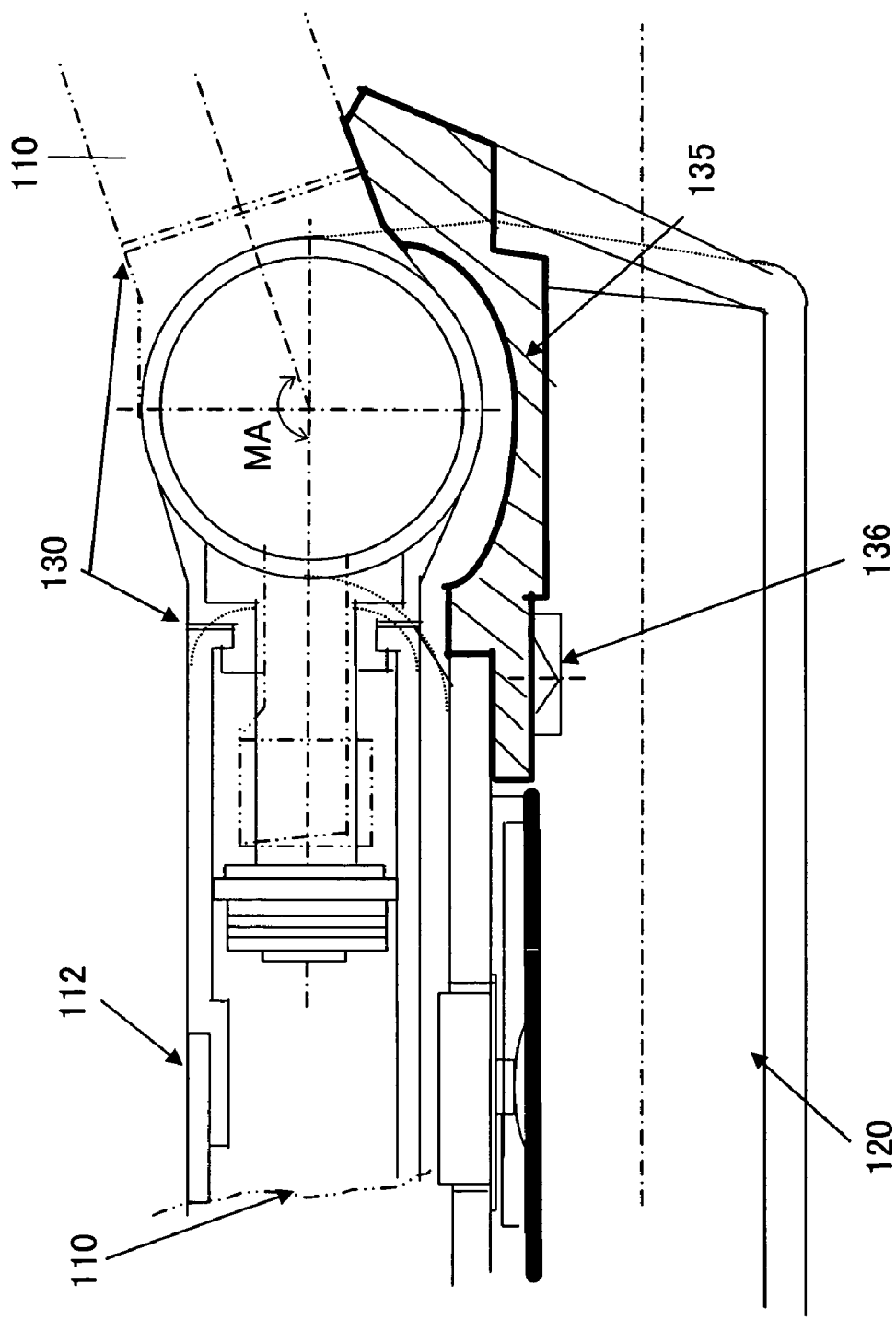
FIG. 15 is a schematic sectional view for explaining a restriction mechanism of an opening angle of a movable-side housing shown in FIG. 1.

As shown in FIG. 3, the convex 131a forms a hollow accommodation part 132a, the convex 131c forms a hollow accommodation part 132c, and the convex part 131b forms a hollow accommodation part 132b. As shown in FIG. 5, which will be described later, the fixed-side housing 120 fixes the fixation plate 133, which engages with and secures a bush 148. The convexes 131a and 131c are provided with a stopper 135 and a screw 136, as shown in FIG. 15, which will be described later.

The hinge cover 103 of the hinge part 130 accommodates the one touch opening mechanism, the free stop mechanism, and the damper mechanism 200, making the PDC 100 small.

The one touch opening mechanism allows the user to press the push button 140, and enables the folded movable-side housing 110 to automatically open relative to the fixed-side housing 120 up to an angle between about 150° and about 170°, such as the best call angle between about 160° and about 170°, in a non-stop motion, and to maintain the angle. While the instant embodiment sets a maximum opening angle less than 180°, the present invention does not limit the maximum opening angle to be between 150° and 170°, as described later with reference to FIGS. 34 to 37. An angle "between about 150° and about 170°" means a callable angle that enables a user to call without further opening of the movable-side housing 120. An angle "between about 160° and about 170°" is ergonomically the best angle for calling. The one touch opening mechanism in the instant embodiment attempts to open the movable-side housing 110 from 0° (where the movable-side housing 110 is completely folded over the fixed-side housing 120) to the best call angle in a non-stop motion, but allows a slight offset from that range. In the following description, the one touch opening mechanism conveniently opens the movable-side housing 110 by the best call angle from the fixed-side housing 120.

The maximum opening angle of the movable-side housing 110 is restricted to the best call angle in this embodiment. A stopper 135, provided onto the convexes 131a and 131c of the hinge part 130 as shown in FIG. 15, serves to an angular restriction. The stopper 135 is fixed onto the fixed-side housing 120 via a screw 136. Here, FIG. 15 is a schematic sectional view for explaining the maximum opening angle MA of the movable-side housing 110. The stopper 135 is made of a rigid material, contacts the rear surface of the movable-side housing 110, and restricts further opening of the movable-side housing 110 when the opening angle of the movable-side housing 110 reaches the maximum opening angle MA.

Figure 34:
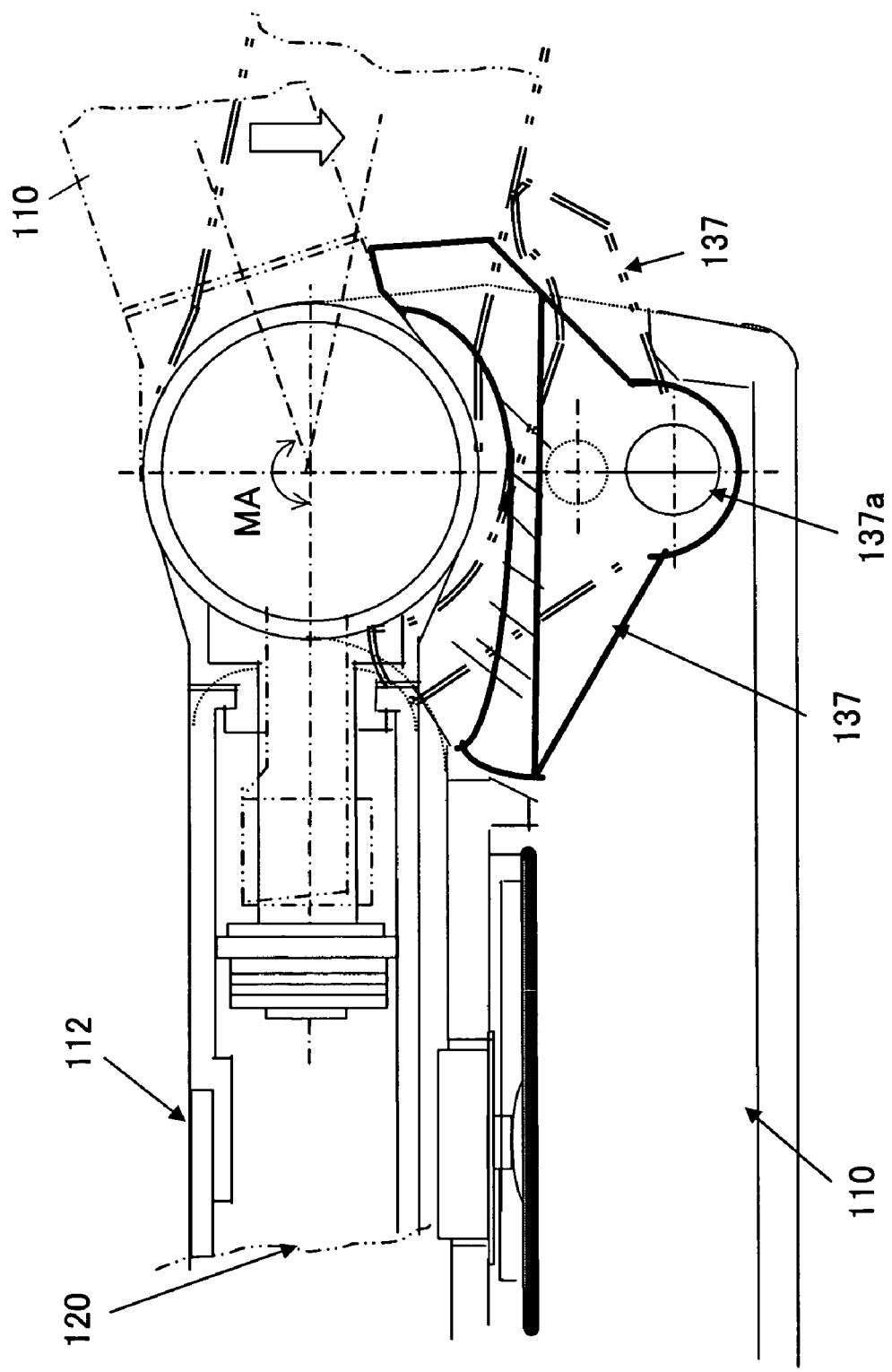
FIG. 34 is a schematic sectional view showing a variation of an angle restricting mechanism shown in FIG. 15.
Figure 35:
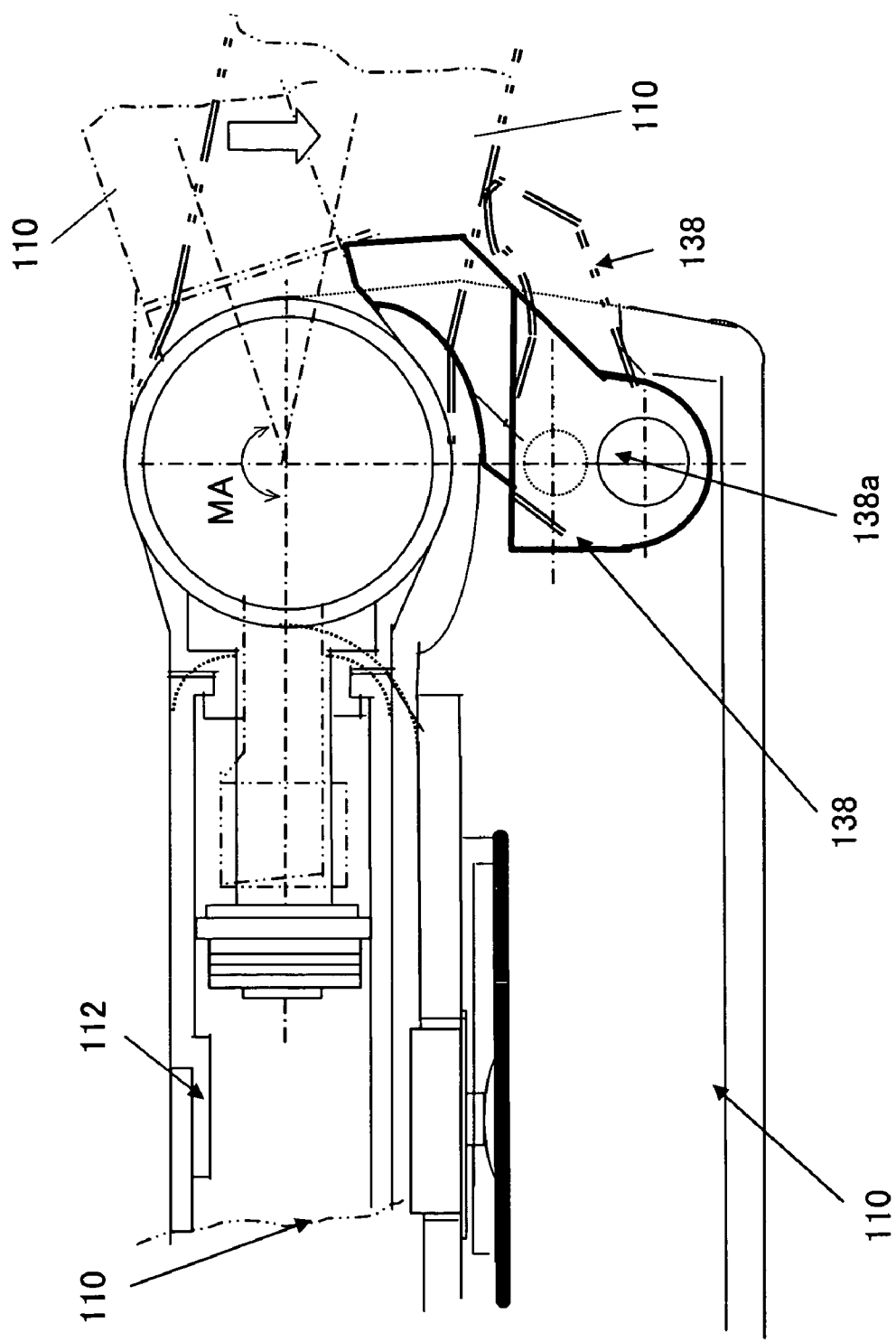
FIG. 35 is a schematic sectional view showing another variation of an angle restricting mechanism shown in FIG. 15.

The present invention does not limit the maximum opening angle of the movable-side housing 110 to the best call angle, and may use another angle restricting mechanism shown in FIGS. 34 and 35. Here, FIGS. 34 and 35 are schematic sectional views of a variation of the other angle restricting mechanism shown in FIG. 15. In the angle restricting mechanism shown in FIG. 15, the load concentrates on the hinge part 130 and may damage the hinge part 130 when the load greater than the strength of the orthogonal shaft of the hinge part 130. Thus, these angle restricting mechanisms allow the movable-side housing 110 to further open even the movable-side housing 110 reaches the best call angle.

The angle restricting mechanism shown in FIG. 34 has a stopper 137 that contacts the movable-side housing 110 that has the best call angle, and restricts further opening of the movable-side housing 110, and the stopper 137 is configured to rotate around a shaft 137*a*. The stopper 137 has a torsion spring (not shown). One end of the torsion spring is fixed onto the fixed-side housing 120, and the other end is attached to the stopper 137. As a result, the stopper 137 is forced to return to the position shown by a solid line even when it displaces as shown by alternate long and two short dashes line in FIG. 34.

Figure 36:
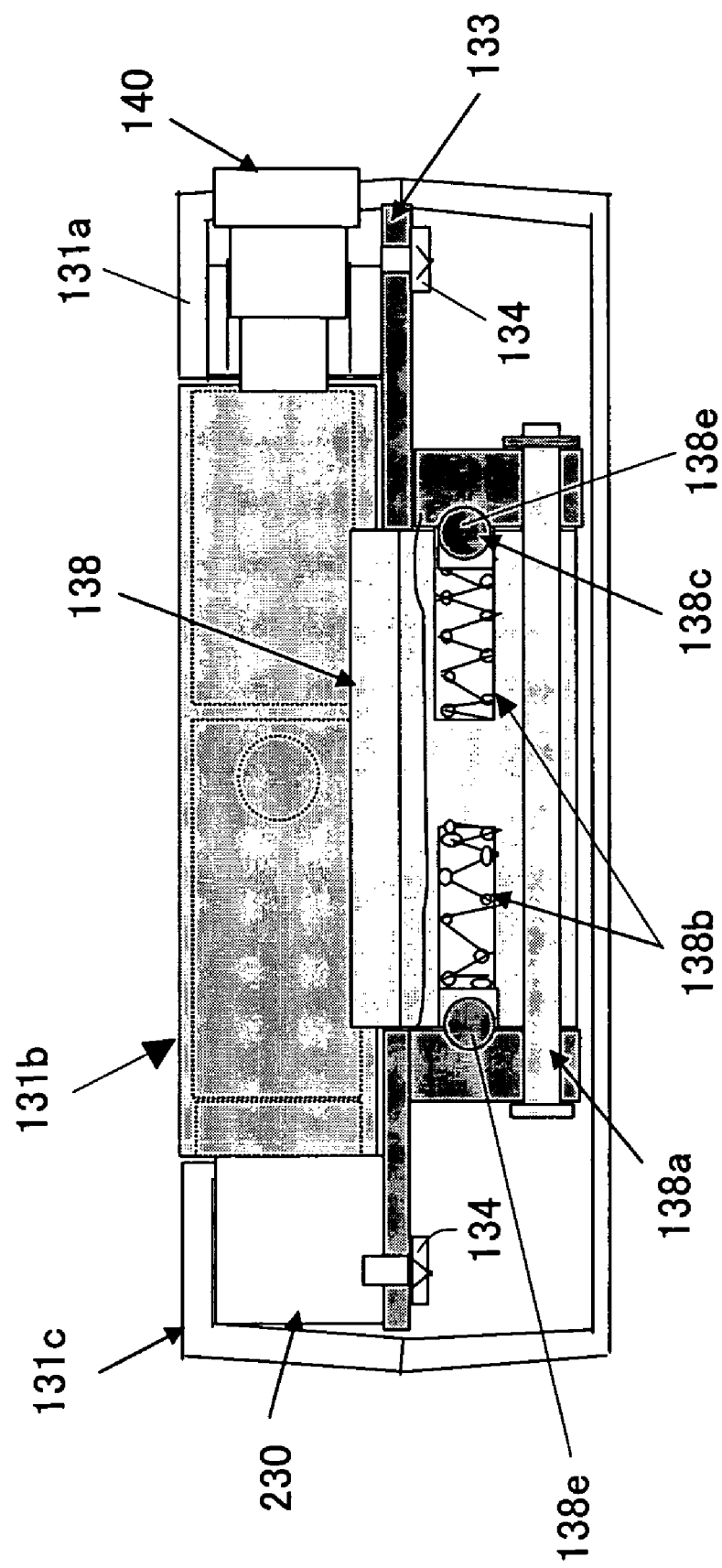
FIG. 36 is a schematic side view of a concrete structure example applicable to the angle restricting mechanism shown in FIG. 35.

Similarly, the angle restricting mechanism shown in FIG. 35 includes, as shown in FIG. 36, a stopper 138, a compression spring 138*b*, a pair of ball cams 138*c*, and a pair of blocks 138*d*. Here, FIG. 36 is a schematic side view of an illustrative angle restricting mechanism shown in FIG. 35.

The stopper 138 restricts contacts the movable-side housing 110 that has the best call angle, and restricts further opening of the movable-side housing 110. The block 138 is fixed onto the fixation plate 133, and has a semispherical groove 138*e*. The shaft 138*a* is connected to the fixation plate 133 and supports the stopper 138 rotatably. The coil spring 138*b* forces the ball cam 138*c* against a groove 138*e* in the block 138*d*. The ball cam 138*c* holds the stopper 138 in cooperation with the fixation plate 133. When the ball cam 138 engages with the groove 138*c* and locks the stopper 138. When the convex 131*b* of the hinge part 130 contacts the stopper 138 and the load is applied, the ball cam 138*c* is pushes out of the groove 138*e* and moves against the elastic force of the coil spring 138*b*, releasing the lock. When the stopper 138 returns to the position of the solid line shown in FIG. 35, the ball cam 138*c* returns to the groove 138*e* and locks the stopper 138. In general, the escaping torque can be set greater than the entering torque for the ball cam 138*c*, and the return can be set to the direct manual pushback torque of the stopper 138.

Figure 37:
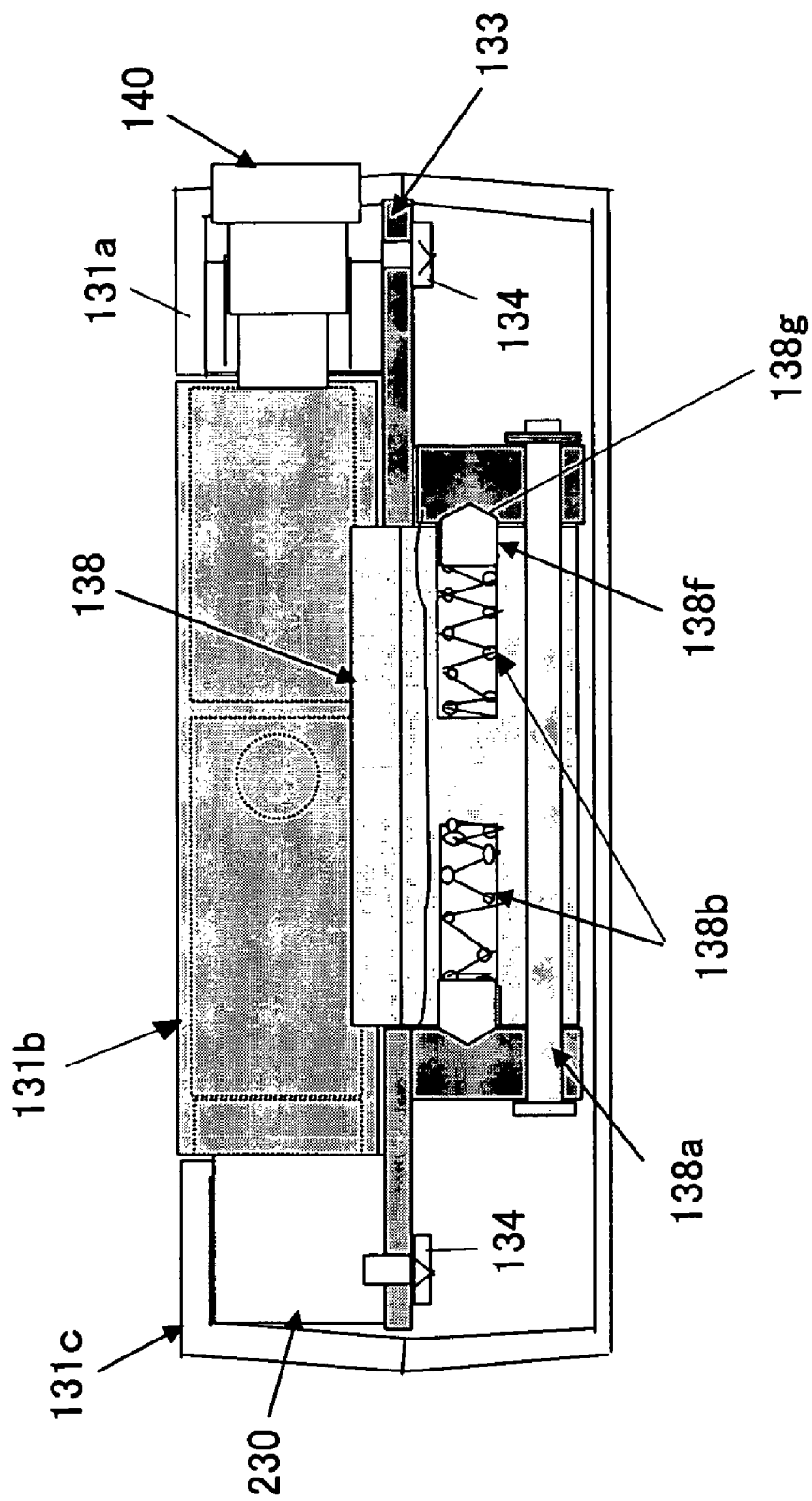
FIG. 37 is a schematic side view of another concrete structure example applicable to the angle restricting mechanism shown in FIG. 35.

Of course, the cam has a shape other than a ball. FIG. 37 shows an illustrative angle restricting mechanism having a pair of conical cams 138*f* and corresponding grooves 138*g*.

As a result, the stopper 138 can be return to a position shown by a solid line even though it displaces as in the alternate long and two short dashes line in FIG. 35.

The free stop mechanism maintains an angle between the movable-side housing 110 and the fixed-side housing 120 to be an arbitrary angle (which is illustratively between 20° and 140° in the instant embodiment). The free stop mechanism is convenient, for example, to photographing by a lens 119 and viewing of the Internet information on a desk. In the instant embodiment, the free stop mechanism works when the user manually opens the movable-side housing 110 from the closed state, and does not work when the user closes the movable-side housing 110 that has been opened by the one touch opening mechanism. However, it is optional whether the free stop mechanism works or does not work at the closing time.

Figure 4:
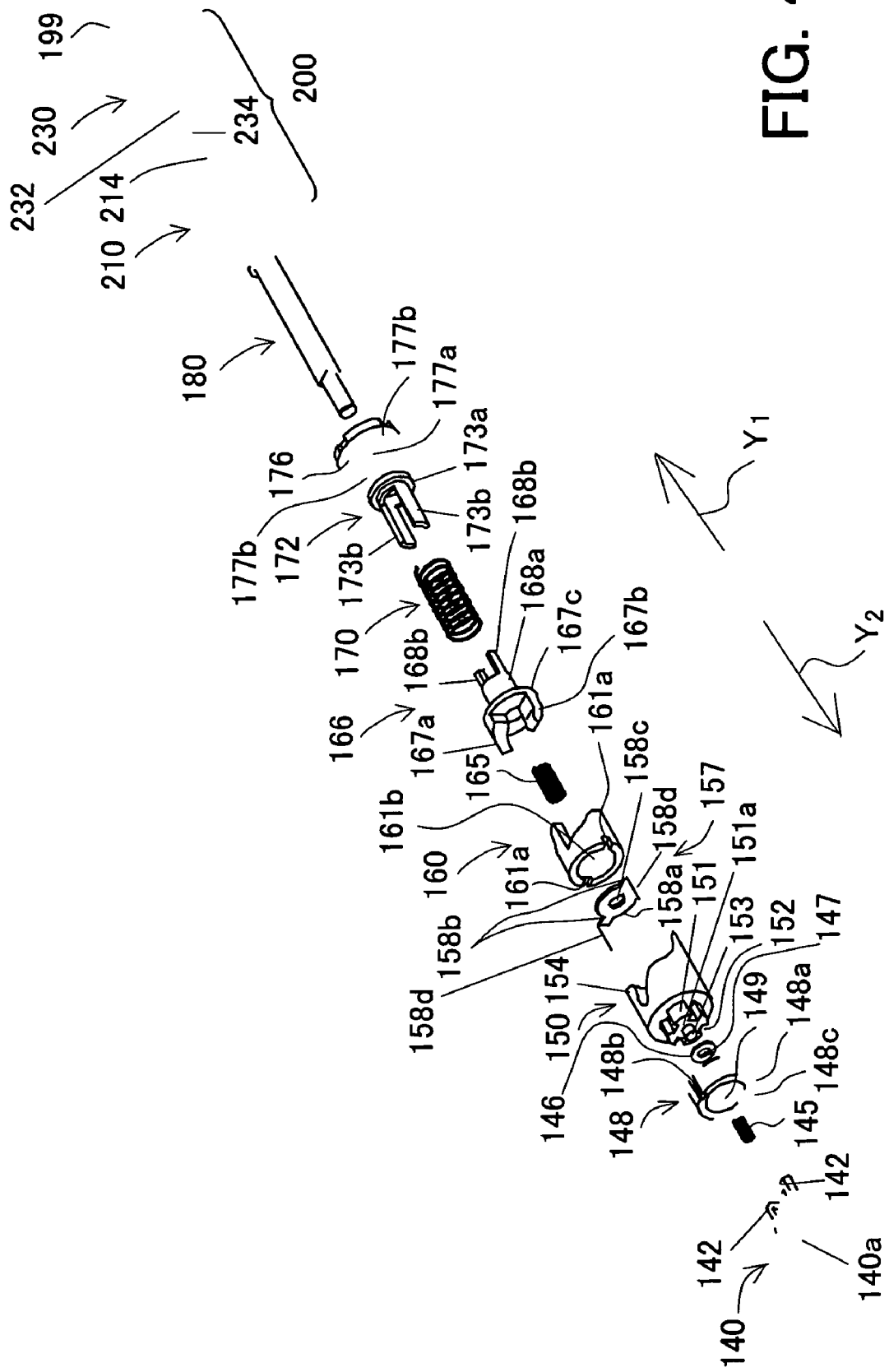
FIG. 4 is an exploded view of an exemplary structure of a part applicable to the hinge part in the portable phone shown in FIG. 2.
Figure 16:
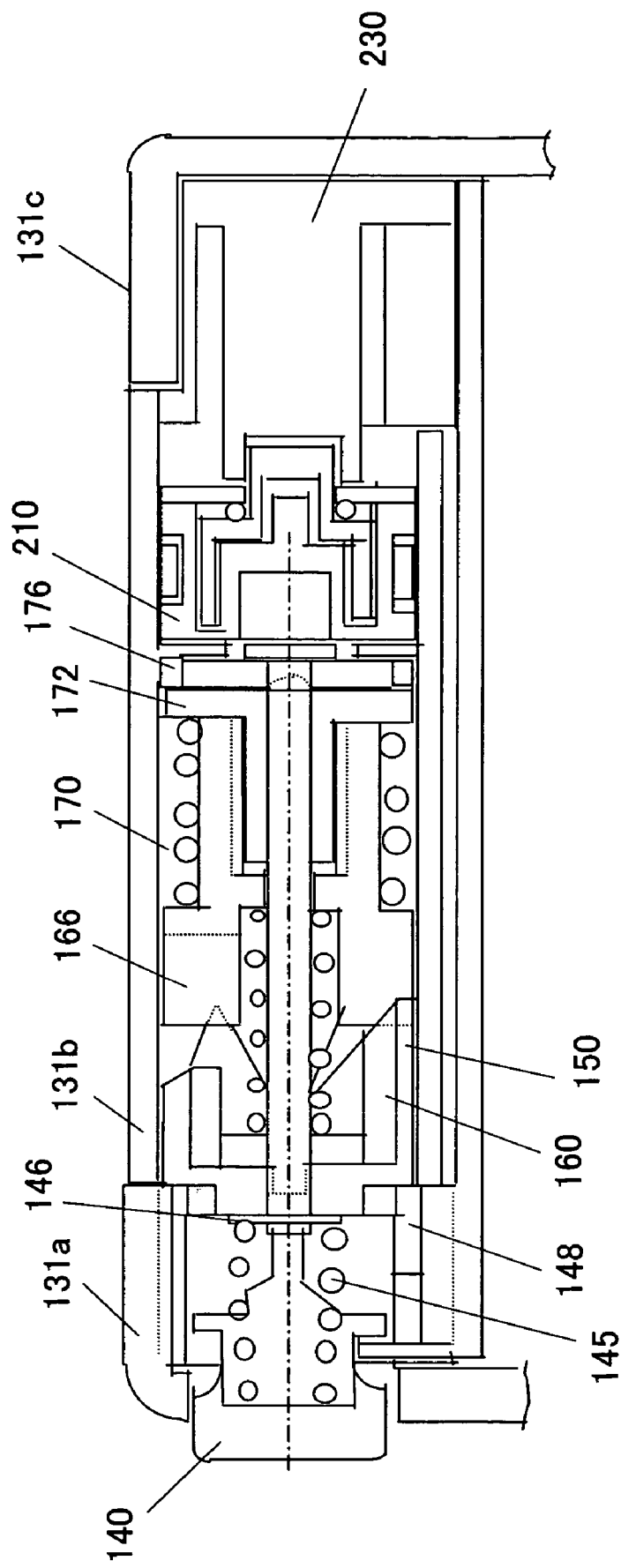
FIG. 16 is a schematic sectional view of the hinge part shown in FIG. 4.

Since some members serve as both the one touch opening mechanism and the free stop mechanism in the instant embodiment, a description will now be given of them simultaneously. These versatile components attempt to miniaturize the part accommodated in the hinge part 130 and, in turn, the PDC 100. FIG. 4 is an exploded perspective view of an internal structure of the hinge part 130 schematically shown in FIGS. 2 and 3. FIG. 16 is a schematic sectional view of the mechanism shown in FIG. 4 that is installed into the hinge part 130.

The part shown in FIG. 4 inactivates the free stop mechanism at the closing time when the one touch opening mechanism has opened the movable-side housing 110, and enables the free stop mechanism to work at the closing time when the user has manually opened the movable-side housing 110. The instant specification sometimes refers to this type of one touch opening/free stop mechanism as a "two-way manner". The two-way manner enables a user not only to open the movable-side housing 110 in a non-stop motion by pressing the push button 140 with his left thumb when the user is in a hurry or uses his right hand for something, but also to manually open the movable-side housing 110 and maintain an arbitrary angle for a fine angular adjustment, for example, for camera functions. As discussed later, the present invention does not limit the part accommodated in the three-part hinge part 130 to the two-way manner.

Referring to FIG. 4, the hinge part 130 includes a push button 140, a compression spring 145, a bush 148, a retaining ring 146, an outer cam 150, a lock 157, an inner cam 160, a compression spring 165, a counter cam 166, a compression spring 170, free stop cams 172 and 176, a shaft 180, a damper mechanism 200, and a cap 199. Those members from the retaining ring 146 to the shaft 180 are schematically shown as the hinge module HM in FIGS. 1 to 3.

In assembly, the convex 131*b* of the hinge part 130 is made cylindrical, and the hinge module HM is inserted to make the bush 148 engaged with the hinge module HM. Then the bush 148 is pushed into the convex 131*b* of the hinge part 130, and fixed by a snap. Next, the push button 140 that accommodates the compression spring 145 is pushed from the side of the convex 131*a*, and fixed by a snap-fit. Thus, the hinge part 130 is mounted.

Figure 9A:
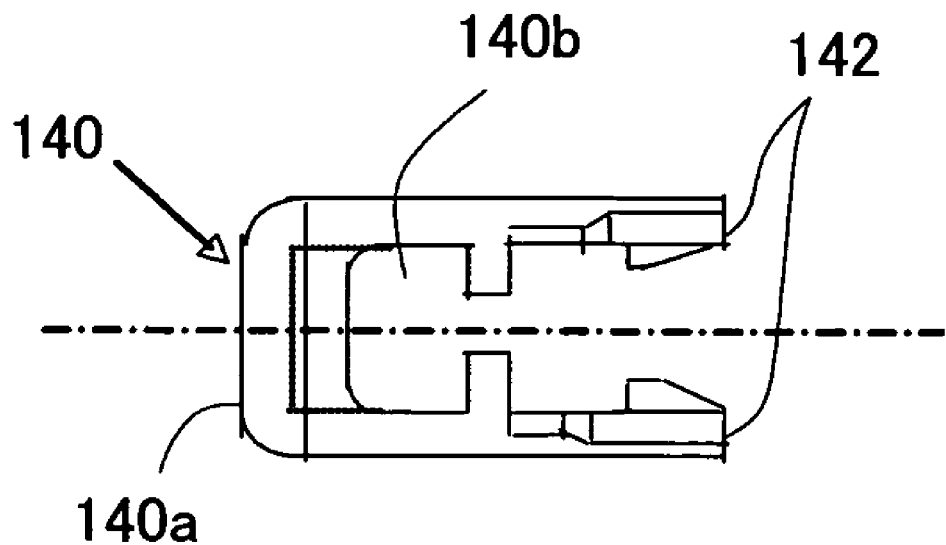
FIG. 9A is a sectional view of a push button shown in FIG. 7.
Figure 9B:
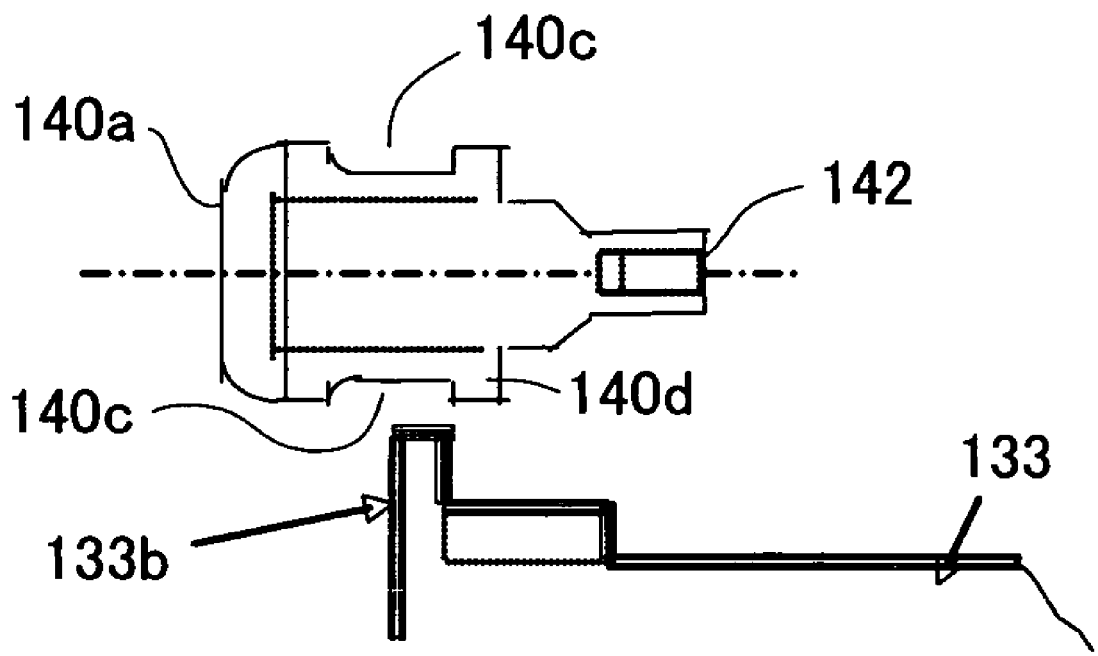
FIG. 9B is a push button and its falling-off preventative part shown in FIG. 8.

The push button 140 is schematically shown in FIGS. 2 and 3, and specifically includes, as shown in FIGS. 4 and 9, a compressed end 140*a* with an approximately hollow cylindrical shape, and a pair of engagement nails 142. Here, FIG. 9A is a sectional view of the push button 140, and FIG. 9B is a sectional view of the push button 140 and its falling-off preventative part.

The push button 140 projects from the hinge part 130, and is to be pressed by a user in one touch opening. The push button 140 when pressed releases the engagement between the lock 157 and the outer cam 150. The push button 140 is provided on the convex 131*a* of the hinge part 130 in the instant embodiment, but may be provided apart from the hinge part 130 on the fixed-side housing 120. Anyway, the push button 140 is not provided on (the top of) the movable-side housing 110, and improves the operability since a user does not have to change his hand that holds the movable-side housing to the fixed-side housing after holding the movable-side housing and opening the housing, as in Japanese Patent Application Publication No. 10-65778.

Figure 7:
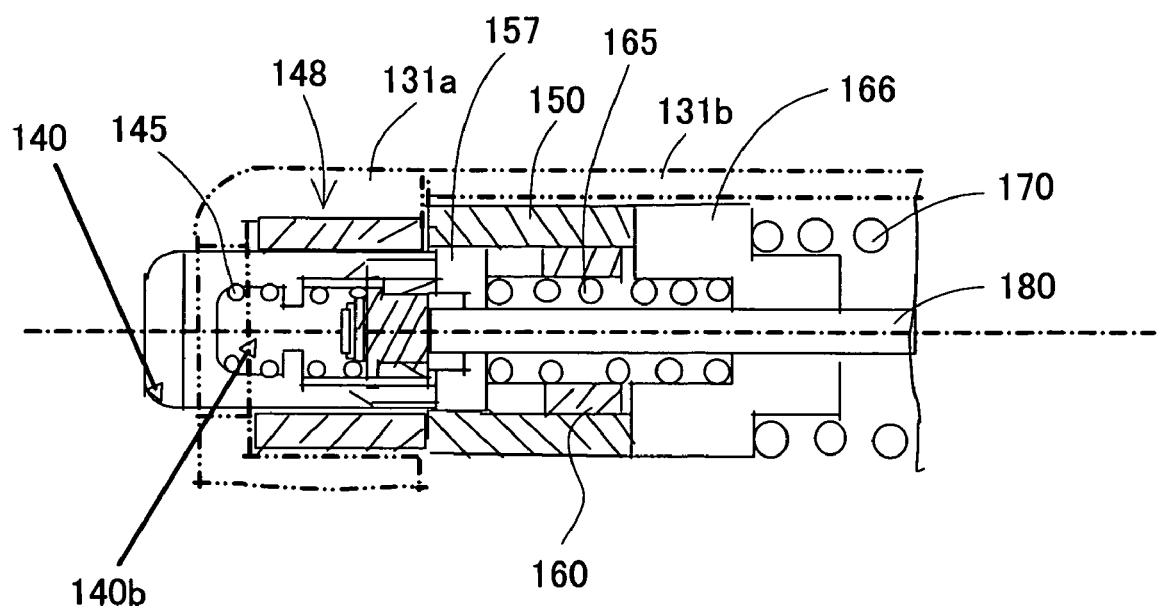
FIG. 7 is a sectional view taken along line A-A in FIG. 5.

The compressed end 140a is a portion subject to a compression force typically applied by the user's left thumb in the one touch opening. While the instant embodiment attaches the push button 140 at the left side of the hinge part 130 so that a right-handed user uses his right hand to make a note, etc. and his left hand to open the PDC 100, the push button 140 may be attached to the right side of the hinge part 130 for left-handed users. While the compressed end 140a has a smoothly chamfered cylindrical or spherical shape, the present invention does not limit a shape of the compressed end 140a. Therefore, the compressed end 140a may have another curved shape. A hollow part 140b is formed inside the compressed end 140a, and accommodates one end of the compression spring 145, as shown in FIG. 7. Here, FIG. 7 is a sectional view of the line A-A in FIG. 5.

The engagement nails 142 each have an approximately right triangle opposite to the compressed end 140a, as shown in FIG. 9A, and are engageable with two of four guide grooves 152 in the outer cam 150.

The push button 140 forms necks 140c on its sides, as shown in FIG. 9B. An insertion of the falling-off preventative projection 133b of the fixation plate 133 into the neck 140c and an engagement between the projection 133b and a wall 140d maintain the push button 140 in place without being fallen out of the hinge part 130 by the compression spring 145's compression force.

The compression spring 145 is a coil spring that serves to force the push button 140 in a projecting direction. One end of the compression spring 145 contacts the end of the hollow part 140b in the push button 140, and the other end contacts the retaining ring 146.

The retaining ring 146 is a partially cut ring or U shape, and engaged with the fixation part 151 of the outer cam 150. The retaining ring 146 may have a circular shape instead of a notched outer periphery shown in FIG. 4. The retaining ring 146 does not necessarily require a cutout, although a peripheral notch or cutout can secure a mechanical engagement between the retaining ring 146 and the bush 148. The retaining ring 146 has a perforation 147, which is engaged with a convex 153 of the outer cam 150. The retaining ring 146 supports the compression spring 145 on a surface at the side of the push button 140, and is mounted on a front surface 151a of the outer cam 150. The retaining ring 146 has an area enough to support the compression spring 145, but its size does not shield the guide grooves 152 from the engagement nails 142.

Figure 6:
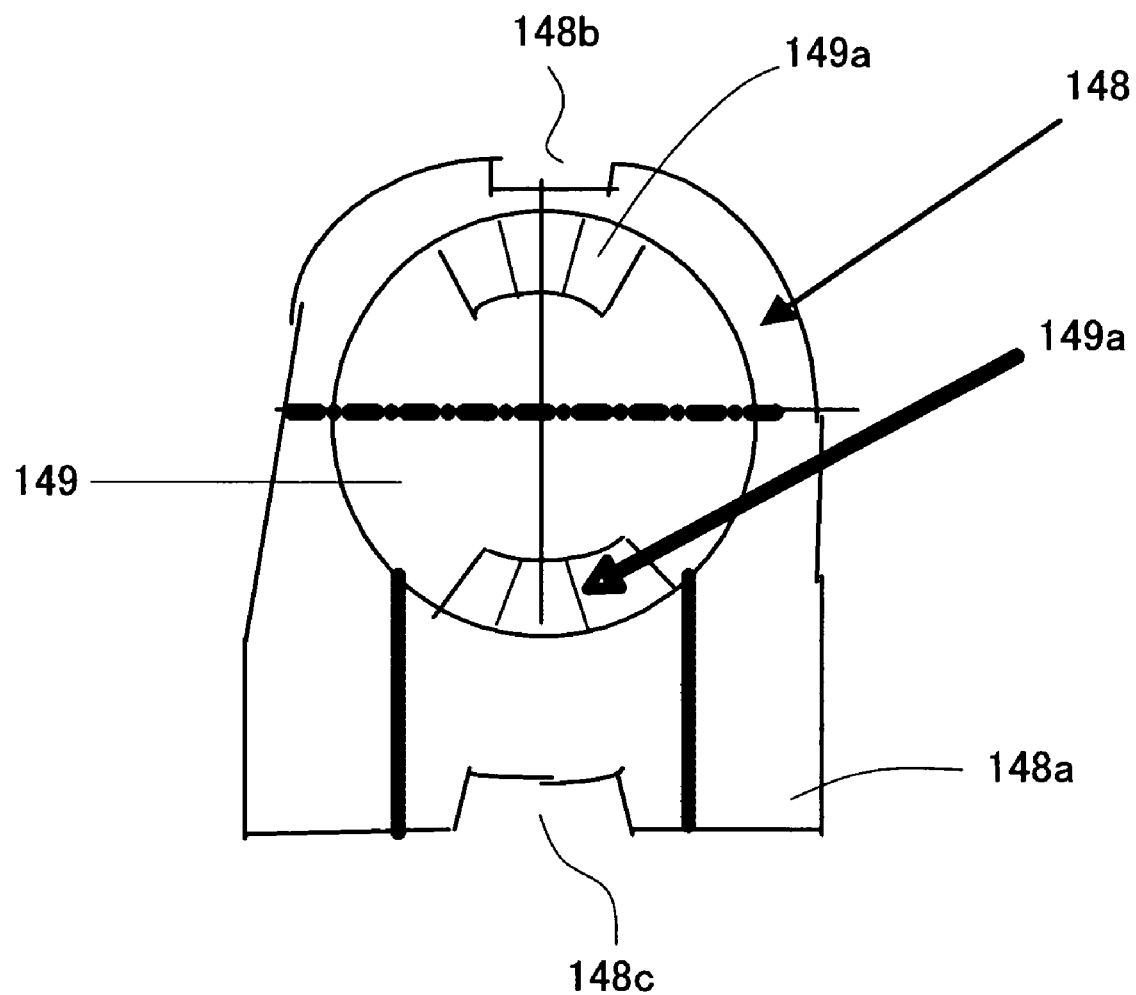
FIG. 6 is a plane view of a bush.

The bush 148 has a shape that combines a rectangle and a semicircle, as shown in FIGS. 4 to 6, and serves to fix the outer cam 150. Here, FIG. 5 is a sectional view of the bush 148 mounted on the hinge part 130, and FIG. 6 is a plane view of the bush 148.

The bush 148 forms a perforation 149 in its center, into which the push button 140, the fixation part 151 of the outer cam 150, the shaft 180 are inserted. The bush 148 has a rectangular support part 148a, and engagement grooves 148b and 148c as a notched part. The support part 148a and the engagement groove 148b are engaged with the convex 131a of the fixed-side housing 120. The engagement groove 148c is engaged with the engagement part 133a of the fixation plate 133 fixed on the fixed-side housing 120 via a screw 134. As a result, the bush 148 is non-rotatably fixed on the convex 131a in the fixed-side housing 120. A shape of the bush 148 is illustrative in the instant embodiment, and the bush 148 may have another shape as long as it is fixed onto the convex 131a.

Figure 8:
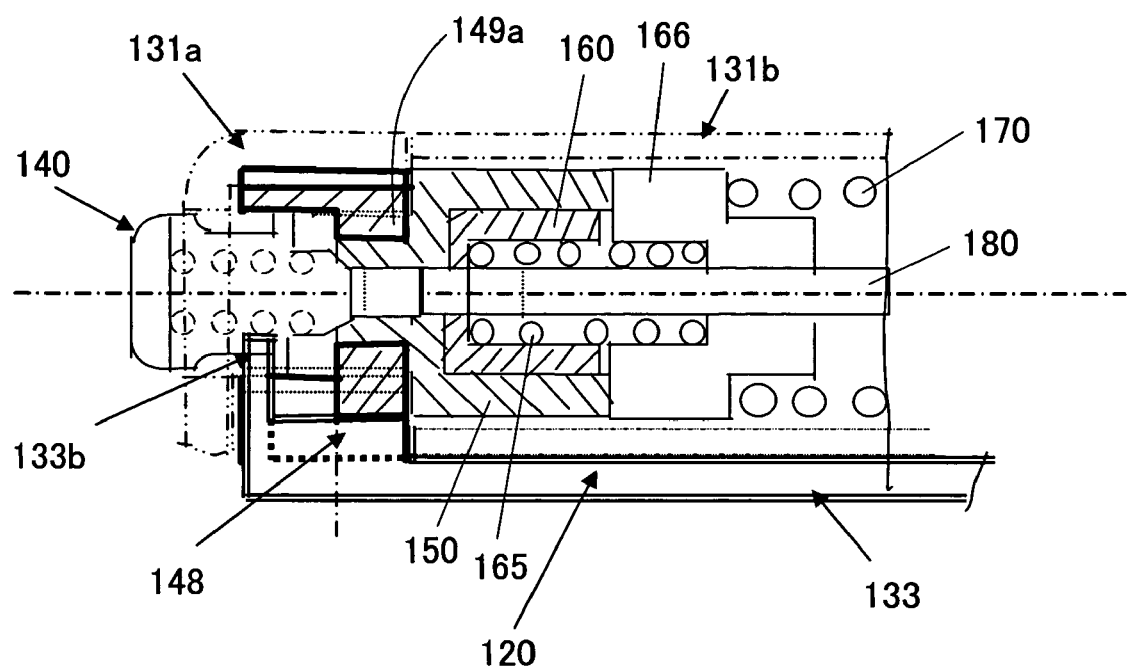
FIG. 8 is a sectional view taken along line B-B in FIG. 5.
Figure 14:
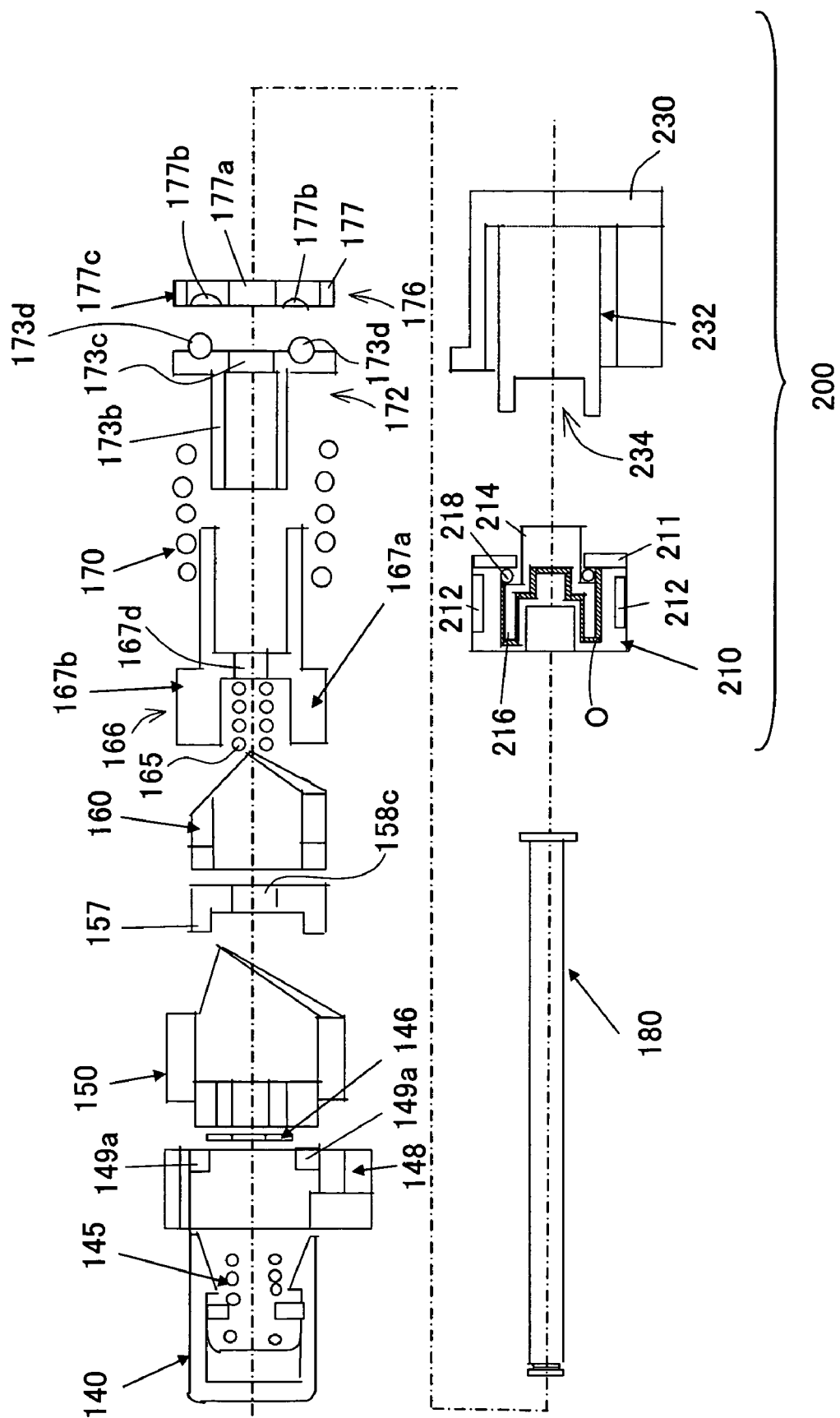
FIG. 14 is a schematic exploded sectional view of a mechanism shown in FIG. 4.

The fixation part 151 of the outer cam 150 is inserted into the perforation 149, and the perforation 149 has a pair of engagement parts 149a, which are engageable with the pair of guide grooves 152 of the outer cam 150, as shown in FIGS. 8 and 14. As a result, the outer cam 150 is fixed non-rotatably onto the bush 148. Here, FIG. 8 is a sectional view taken along line B-B in FIG. 5. FIG. 14 is a schematic sectional view of the part shown in FIG. 4. The instant embodiment provides the bush 148 with the convex engagement parts 149a and the outer cam 150 with the guide grooves 152, but their relationship may be reversed.

The outer cam 150 moves the counter cam 166 in cooperation with the inner cam 160 to realize the one touch opening function, and has the fixation part 151 and a body 154.

The fixation part 151 projects in a direction $Y_2$ in FIG. 4, and has a pillar shape with an approximately cross or X-shaped section. The fixation part 151 has an approximately cylindrical convex part 153 at its center. The convex part 153 projects in the direction $Y_2$, and is inserted into the perforation 147 in the retaining ring 146. The fixation part 151 supports the retaining ring 146 on its front surface 151a. The front surface 151a has a completely or cut circular portion approximately as large as the retaining ring 146, and supports the retaining ring 146. The fixation part 151 is, for example, a cylinder bored with four circular or elliptical portions at intervals of 45°, and four bored portions as guide grooves 152 perforate the outer cam 150 in the direction $Y_2$. Since a pair of guide grooves 152 are engaged with the engagement parts 149a of the bush 148, as shown in FIG. 8, to fix the bush 148 in the fixed-side housing 120 as discussed, the outer cam 150 is fixed non-rotatably in the hinge part 130. A pair of arms 158d of the lock 157, which will be described later, and the engagement nail 142 of the pressed push button 140 can be inserted into the rest of two guide grooves 152.

Figure 11:
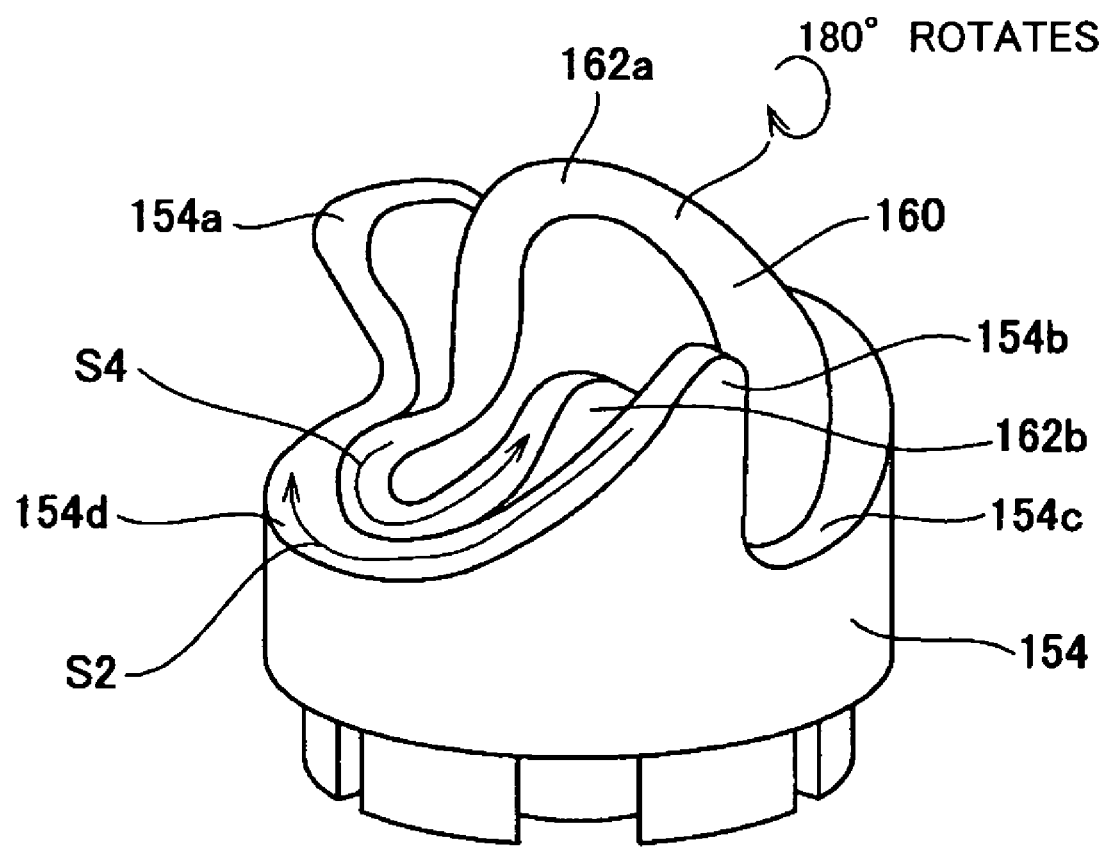
FIG. 11 is a schematic perspective view showing an assembly between outer and inner cams shown in FIG. 4.
Figure 12:
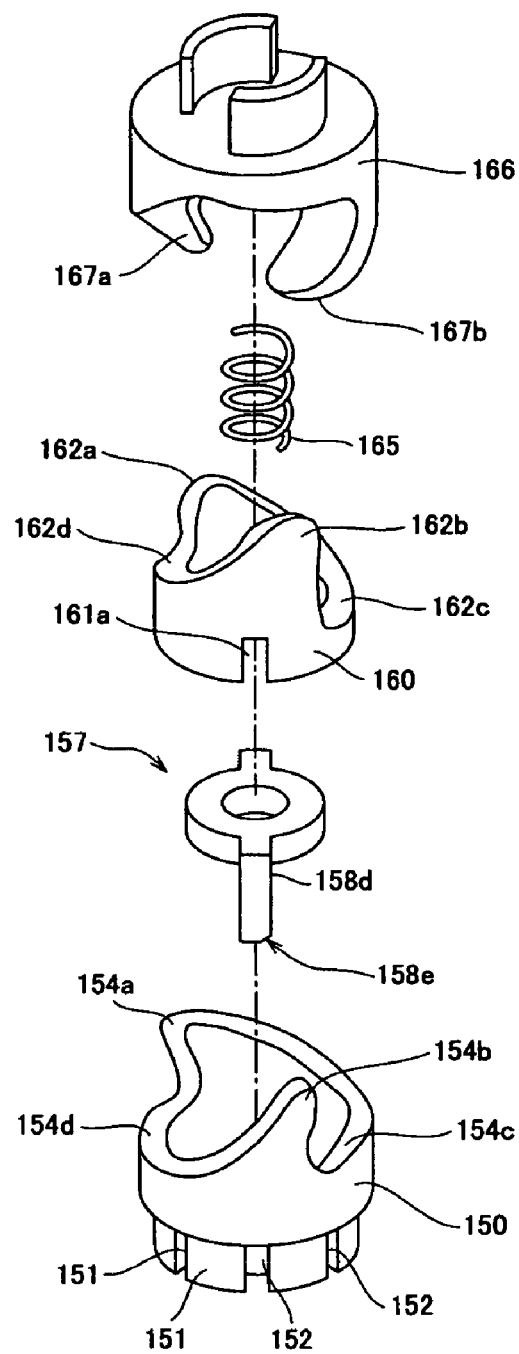
FIG. 12 is an exploded perspective view from the outer cam and a counter cam shown in FIG. 4, which is viewed from a different angle.

The body 154 forms, as shown in FIGS. 11 and 12, a pair of hills 154a and 154b and a pair of indents 154c and 154d. The hill 154a and the indent 154c may have shapes symmetrical to or different from those of the hill 154a and the indent 154c. Here, FIG. 11 is a perspective overview of the outer cam 150, into which the inner cam 160 is inserted, while the lock 157 is engaged with the guide grooves 152. FIG. 12 is an exploded perspective view from the outer cam 150 to the counter cam 166 viewed from a different angle.

In cooperation with the push button 140's engagement nails 142, the lock 157 serves to engage the movable-side housing 110 with the fixed-side housing 120 and to disengage the movable-side housing 110 from the fixed-side housing 120. The lock 157 includes a disc 158a, a pair of shoulders 158b, a perforation 158c, and a pair of arms 158d. The lock 157 is made, for example, of an insulated metal plate.

The disc 158a supports one end of the compression spring 165, and forms the perforation 158c into which the shaft 180 is inserted. The disc 158a has a pair of shoulders 158b at symmetrical positions. The shoulders 158b extend with a predetermined width from the disc 158a in opposite directions, and are engaged with a pair of fixation grooves 161a in the inner cam 160. As a result, the lock 157 works together with the inner cam 160.

Figure 13A:
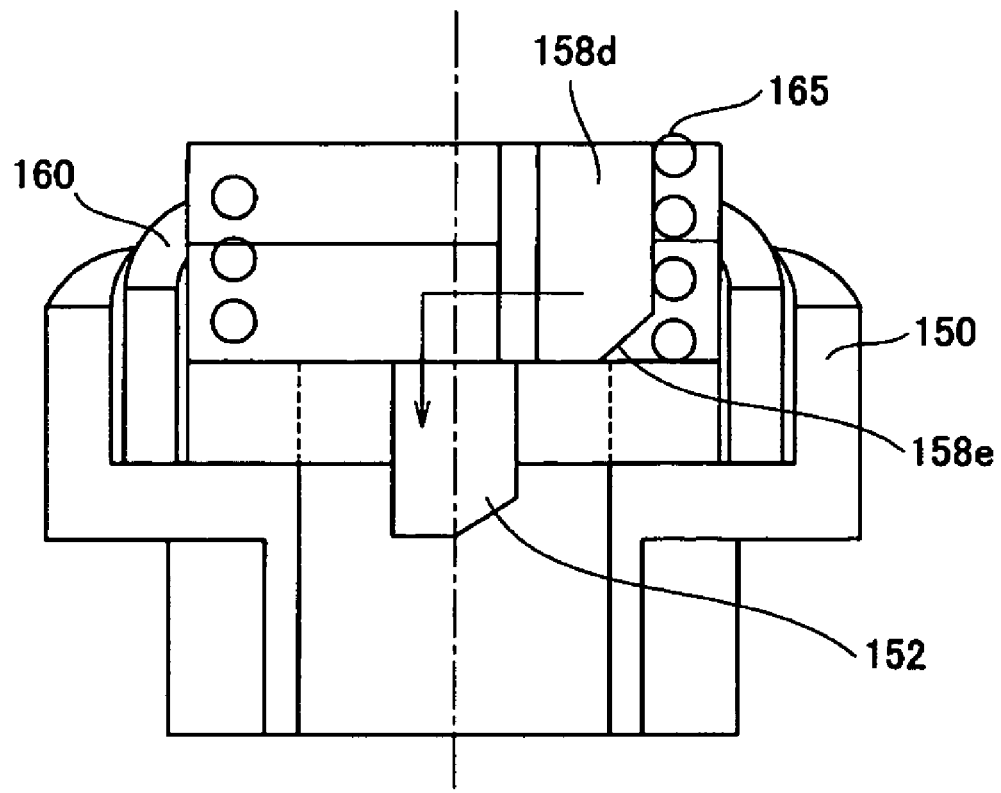
FIGS. 13A and 13B are schematic sectional views showing a rotation of a lock by 180° shown in FIG. 4.
Figure 13B:
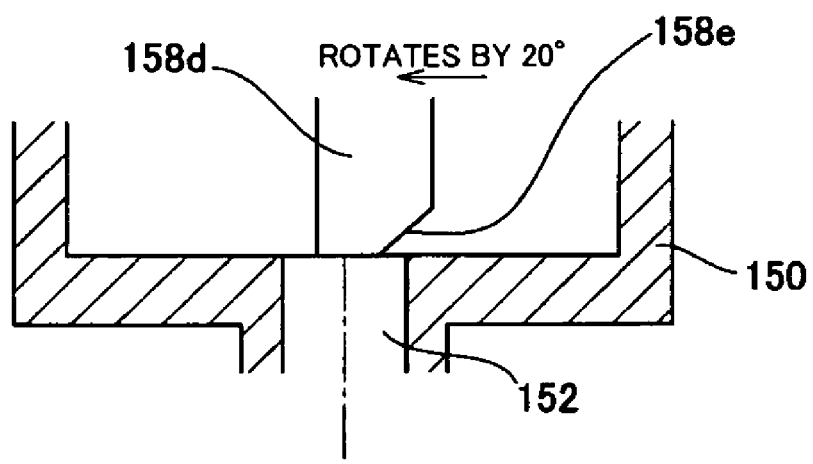

A pair of arms 158d are formed by bending the shoulders 158b at 90° in the direction $Y_2$, and inserted into the pair of guide grooves 152 in the outer cam 150. As shown in FIGS. 12 and 13, each arm 158d has a chamfered part 158e at its top. Here, FIGS. 13A and 13B are schematic sectional views for explaining a rotation of 180° of the lock.

As discussed, the stopper 135 sets the movable-side housing 110's maximum opening angle MA to the best call angle, and the lock 157 thus rotates by 160° as the movable-side housing 110 opens by 160°. In this state, as shown in FIG. 13B, the chamfered part 158e of each arm 158d of the lock 157 contacts an edge of the outer cam 150's guide groove 152

(that is located at a position rotated by 180° relative to the guide groove 152 before the movable-part 110 opens). However, the spring 165 forces the lock 157 toward the outer cam 150, and the chamfered parts 158e proceed into the guide groove 152. This proceeding corresponds to a rotational angle of 20°. In other words, the lock 157 further rotates by 20°, as shown by an arrow in FIG. 13A, after the movable-side part 110 opens by 160°, whereby the arms 158d are engaged with the guide grooves 152 in the cam 150. Thus, when the push button 140 is pressed, the movable-side housing 110 rotates by about 160°, but the lock 157 rotates by 180° and is engaged with the guide grooves 152. Of course, the guide grooves 152, into which each arm 158d is inserted, changes position by 180° in this case.

The inner cam 160 is inserted into the outer cam 150, and allows movements and rotations of the counter cam 166. As shown in FIG. 12, the inner cam 160 includes a pair of hills 162a, 162b and a pair of indents 162c, 162d. As shown in FIG. 11, when the inner cam 160 is inserted into the outer cam 150 and the arms 158d of the lock 157 are inserted into the guide grooves 152 in the outer cam 150, dents are created between the hill 154a of the outer cam 150 and the hill 162a of the inner cam 160 and between the hill 154b of the outer cam 150 and the hill 162b of the inner cam 160. The inner cam 160 is fixed since the outer cam 150 is fixed onto the bush 148 and the lock 157 is fixed onto the outer cam 150. Therefore, before the push button 140 is pressed, the hills 162a and 162b of the inner cam 160 prevent a pair of convexes 167a and 167b of the counter cam 166 from sliding down to the indents 154c, 154d of the outer cam 150 beyond the dents. The inner cam 160 in the instant embodiment shows the same state as that of the opening angle of 0° of the movable-side housing 110 when the lock 157 rotates by 180°.

The compression spring 165 contacts the disc 158a of the lock 157 at its one end, and a base 167c of the counter cam 166 at its other end, and serves to force the arms 158d of the lock 157 toward the guide grooves 152 in the outer cam 150.

The counter cam 166 serves to open the movable-side housing 110 up to the best call angle relative to the fixed-side housing 120 by moving and rotating relative to the outer cam 150 and the inner cam 160. The lock 157 and the inner cam 160 rotate by 180° when the movable-side housing 110 rotates, for example, by 160°; the counter cam 166 simply slides down to the indents 154c, 154d along the inclined surfaces on the outer cam 150, and its rotational angle is 160°. The counter cam 166 includes the pair of convexes 167a, 167b, the base 167c, a body 168a, and a pair of legs 168b. These convexes 167a, 167b may have the same shape or different shapes.

Figure 10:
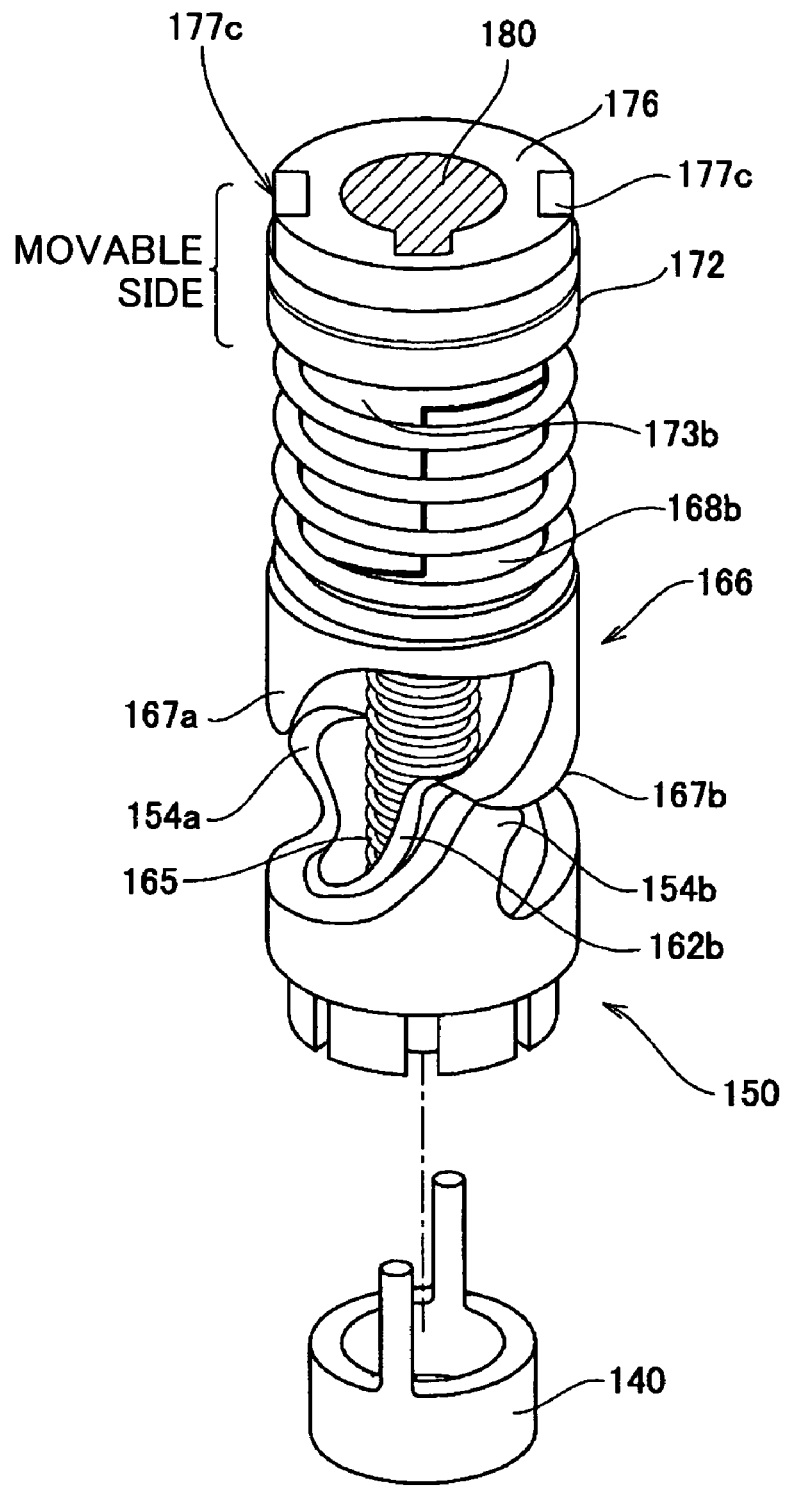
FIG. 10 is a schematic perspective view of an assembly that omits a bush and damper part shown in FIG. 4.

Before the push button 140 is pressed, the convex 167a is located near the hill 154a of the outer cam 150, and the convex 167b is located near the hill 154b of the outer cam 150, as shown in FIG. 10. Here, FIG. 10 is a schematic perspective view of an assembly from the push button 140 to the free stop cam 176, and omits the bush 148. In this state, as discussed with reference to FIG. 11, the hills 162a and 162b of the inner cam 160 prevent the convexes 167a and 167b from moving along the inclined surface on the outer cam 150.

The base 167c has a perforation 167d in its center, and supports other end of the compression spring 165. The body 168a has a hollow cylindrical shape, and is fixed onto a rear surface of the base 167c. A pair of legs 168b have such lengths that they are engaged with (i.e., not separated from) the arms 173b of the free stop cam 172 when the convexes 167a, 167b are located near the hills 154a, 154b and the indents 154c, 154d of the outer cam 150, as shown in FIG. 10.

The compression spring 170 is provided between the counter cam 166 and the free stop cam 172 and around the body 168a and legs 168b and the arms 173b of the free stop cam 172, and forces the counter cam 166 in the direction $Y_2$ and the free stop cam 172 in the direction $Y_1$. Thus, the instant embodiment uses only the compression springs 145, 165 and 170, and does not use any torsion spring. The movable-side housing 110 does not open due to a spring's torsion force, but opens due to the counter cam 166's movements and rotations.

The free stop cams 172 and 176 have some features. First, the free stop cams 172 and 176 assist the one touch opening function in cooperation with the counter cam 166. Second, the free stop cams 172 and 176 serve as a free stop function. Third, the free stop cams 172 and 176 force the movable-side housing 110 so that the opening angle can be 0° when the movable-side housing 110 temporarily opens relative to the fixed-side housing 120 at an angle between 0° and 20°, while the opening angle can be 160° when the temporal angle is between 140° and 160°. The instant embodiment uses this versatility to miniaturize the hinge part 130 and, in turn, the PDC 100.

As shown in FIGS. 4 and 14, the free stop cam 172 has a disc base 173a having a perforation 173c, a pair of arms 173b that symmetrically extend from the base 173a in the direction $Y_2$, and a pair of semispherical projections 173d symmetrically located in the direction $Y_1$. The convex 131b of the hinge part 130 at the movable-side housing 110 accommodates those members from the outer cam 150 to the free stop cam 176.

The free stop cam 176 includes a disc base 177, which has a perforation 177a, a pair of semispherical dimples 177b, and a fixation part 177c. The dimples 177b are formed on the surface of the base 177, and the fixation part 177c is provided on the side surface of the base 177.

A pair of arms 173b of the free stop cam 172 are engageable with the legs 168b of the counter cam 166. In other words, the arms 173b have such lengths that the arms 173b are engaged with (i.e., not separated from) the legs 168b when the convexes 167a, 167b of the counter cam 166 are located at the dents between hills of the outer and inner cams 150 and 160, as shown in FIG. 10, and at the indents 154c and 154d. When the arms 173b are disengaged from the legs 168b, the rotational force applied to the counter cam 166 does not transmit to the free stop cam 172.

A pair of projections 173d of the free stop cam 172 are engageable with a pair of dimples 177b on the free stop cam 176 in a certain angular range. The instant embodiment sets this angular range to about 30°. In FIG. 14, the free stop cams 172 and 176 twist relative to each other but the twisted angle is within about 30°, the projections 173d are located within the dimples 177b. When the projections 173d are located within the dimples 177b, the compression spring 170's elastic force is applied to correct an angular offset between the projection 173d and the dimple 177b. Therefore, when the twisted angle is within about 30°, the free stop cams 172 and 176 are subject to a force to reset twisting. This is the above third function. The third function enables a user to feel a click, and has an advantage in that the movable-side housing 110 is maintained stable when the fixed-side housing 120 is shaken. A feel of a click enables a user who has changed an opening angle of the movable-side housing 110 to 0° or about 160° to actually feel that angle.

When an opening angle of the movable-side housing 110 is 0°, an angular offset between the projection 173d and the dimple 177b is set 10°. When the opening angle of the movable-side housing 110 is 20°, the angular offset between them becomes 30°. Therefore, when the opening angle of the movable-side housing 110 is between 0° and 20°, the movable-side housing 110 is subject to a closing force.

On the other hand, as the movable-side housing 110 opens by about 160°, the counter cam 166 rotates with the free stop cam 172 by about 160°. Therefore, the free stop cam 172' projections 173d also rotate by about 160°. When the opening angle of the movable-side housing 110 is 140°, the angular offset between the projection 173d and the opposite dimple 177b becomes 30°. When the opening angle of the movable-side housing 110 is 160°, the angular offset between them becomes 10°. Therefore, when the opening angle of the movable-side housing 110 is between 140° and 160°, the movable-side housing 110 is subject to an opening force.

The fixation part 177c of the free stop cam 176 includes, as shown in FIG. 10, a pair of key grooves, into which convexes (not shown) on the convex 131b are inserted for fixations. Therefore, the free stop cam 176 rotates with the convex 131b.

When the push button 140 is pressed, the counter cam 166 moves and rotates. Since the counter cam 166 and the free stop cam 172 are engaged with each other via the legs 168b and arms 173b, the free stop cam 172 rotates with the counter cam 166. The convex 167b of the counter cam 166 slides down on the inclined surface S2 along the arrow in FIG. 11. Since the free stop cams 172 and 176 are engaged with each other, the rotational force transmits to the free stop cam 176. As a result, the free stop cams 172 and 176 rotate together. This is the above first function.

When the movable-side housing 110 is manually opened without pressing of the push button 140, the inner cam 160 does not rotate and the counter cam 166 is locked in place shown in FIG. 10. Therefore, the counter cam 166 and the free stop cam 172 engaged with the counter cam 166 stand still even when the movable-side housing 110 opens. On the other hand, the free stop cam 176 rotates with the convex 131b.

For the opening angle of the movable housing 110 between 20° and 140°, the projections 173d of the free stop cam 172 move on the surface of the base 177 apart from the dimples 177b of the free stop cam 176. This is a relative movement viewed from the free stop cam 176, and what moves indeed is the free stop cam 176. In this case, the compression spring 170 compresses the free stop cam 172 against the free stop cam 176, and this compression force or contact force fixes the free stop cam 176 in place against the free stop cam 172 at an arbitrary angle. This is the above second function.

Assume that the push button 140 is pressed, the movable-side housing 110 moves to the best call angle, and then the movable-side housing 110 is manually closed. When the push button 140 is pressed and the movable-side housing 110 moves to the best call angle, the convexes 167a and 167b of the counter cam 167 in FIG. 10 are located on the indents 154c and 154d of the outer cam 150. Even in this state, the legs 168b are engaged with the arms 173b. The lock 157 rotates by 180° and is engaged with the outer cam 150 again, and the inner cam 160 is locked.

Then, when the movable-side housing 110 is manually closed, the free stop cam 176 rotates with the convex 131b. The free stop cam 172 rotates with the free stop cam 176, and the free stop function does now work. The rotational force transmits to the counter cam 166 via the arms 173b and legs 168b. The inner cam 160 does not rotate, and the convexes 167a, 167b of the counter cam 166 slide up on the inclined surface. For example, the convex 167b of the counter cam 166 slides up on the inclined surface S4 along the arrow direction. Thus, while the counter cam 166 slides down on the inclined surface of the outer cam 150 in one touch opening, the counter cam 166 moves up on the inclined surface of the inner cam 160 and returns to the state shown in FIG. 10, if the movable-side housing 110 is then manually closed.

The shaft 180 perforates through the perforation 177a in the free stop cam 176, the perforation 173c of the free stop cam 172, between the pair of arms 173b, between the pair of legs 168b of the counter cam 166, the perforation 167d, the perforation 161b in the inner cam 160, and the perforation 158c in the lock 157, and facilitates rotations from the lock 157 to the free stop cam 176. Since the shaft 180 has the stopper 182 engageable with the free stop cam 176, the shaft 180 and the free stop cam 176 rotate together.

The cap 199 has a disc shape, as shown in FIGS. 2 and 3, and hides the part shown in FIG. 4 from the outside. As long as the cap 199 has this hiding function, the cap 199 may have a convex shape as shown in FIGS. 2 and 3.

The damper part 200 serves to brake the opening movable-side housing 110 in one touch opening, and includes a damper 210, and a damper bush 230. The damper mechanism 200 improves the safety, because the PDC never jumps out of the user's hand due to a kick or reaction of an opening when the movable-side housing 110 opens to the best call angle in one action. The damper 210 is provided to the convex 131b of the hinge part 130 at the movable-side housing 110 side, and is not connected to the shaft 180. The damper bush 230 is provided to the convex 131c of the hinge part 130 at the fixed-side housing 120 side. An arrangement of the damper 210 and the damper bush 230 may invert as long as the FPCB 102, which will be described later, can be properly arranged.

This embodiment sues an oil damper for the damper 210, but the present invention does not limit the type of the damper. In addition, the oil damper described in this embodiment may use another structure known in the art. As shown in FIG. 14, the damper 210 includes an approximately cylindrical housing 211, a square shaft 214 rotatably accommodated in the housing 211, a hollow cylindrical agitator 216 coupled with the shaft 214, and an O-ring 218, and silicone oil O is filled in a hatched portion in FIG. 14. The O-ring 218 enables the agitator 216 to agitate the oil O while the oil O is sealed. The housing 211 is engaged with the movable-side housing 110 at an engagement part 212.

The damper bush 230 has a shaft 232 that has a square bearing 234 engageable with the shaft 212 at its top. The shapes of the shaft 212 and the bearing 234 are not limited to a square shape as long as they can be engaged with each other. This is true of the following variations. Since the shaft 214 of the damper 210 is fixed by the damper bush 230, the housing 211 rotates with the movable-side housing 110 as the movable-side housing 110 opens. Due to a relative rotation between the agitator 216 and the housing 211, the housing 211 receives braking force from the viscosity resistance of the oil O. The oil damper 160 realizes the damper function when the agitator 216 agitates the oil O. The agitator 216 may use a structure known in the art, such as a vane rotator.

A flexible printed circuit board ("FPCB") 102 and a non-FPCB ("NFPCB") that is a cable that overlaps the FPCB 102 and is other than the FPCB, such as a coaxial cable for an antenna and a power cable, are twisted and accommodated in the movable-side housing 110, the fixed-side housing 120 and the hinge part 130. The reason why the FPCB 102 is twisted is to provide the FPCB 102 with the elastic force, reduce the load applied to the FPCB 102, and facilitate the opening by making the elastic force to act in the opening direction. While this embodiment connects the FPCB 102 and the NFPCB and allow them as one member to pass through the hinge part 130, both may pass through the hinge part 130 independently.

Figure 17:
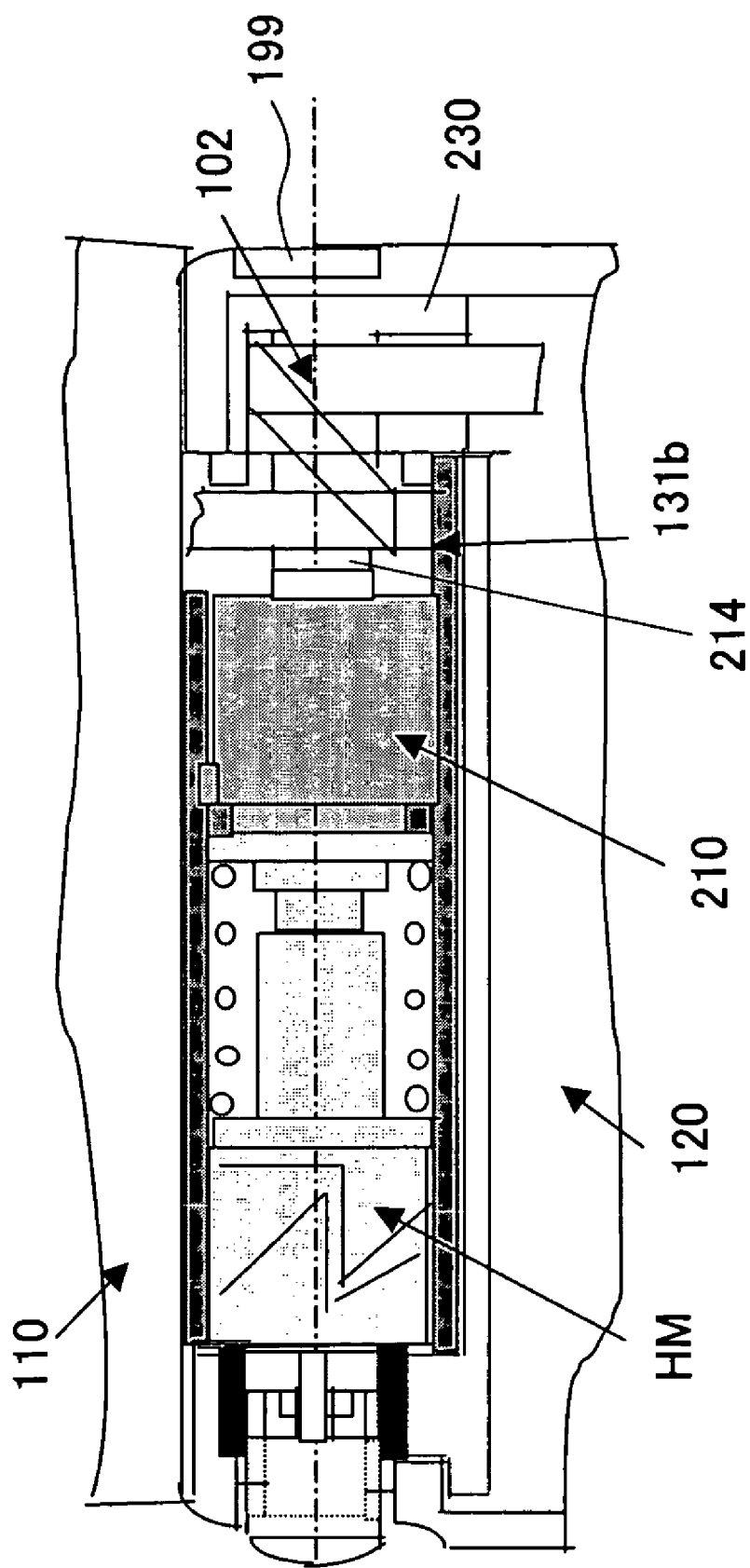
FIG. 17 is a schematic sectional view for explaining a structure to attach a flexible printed circuit board to the hinge part shown in FIG. 1.
Figure 18:
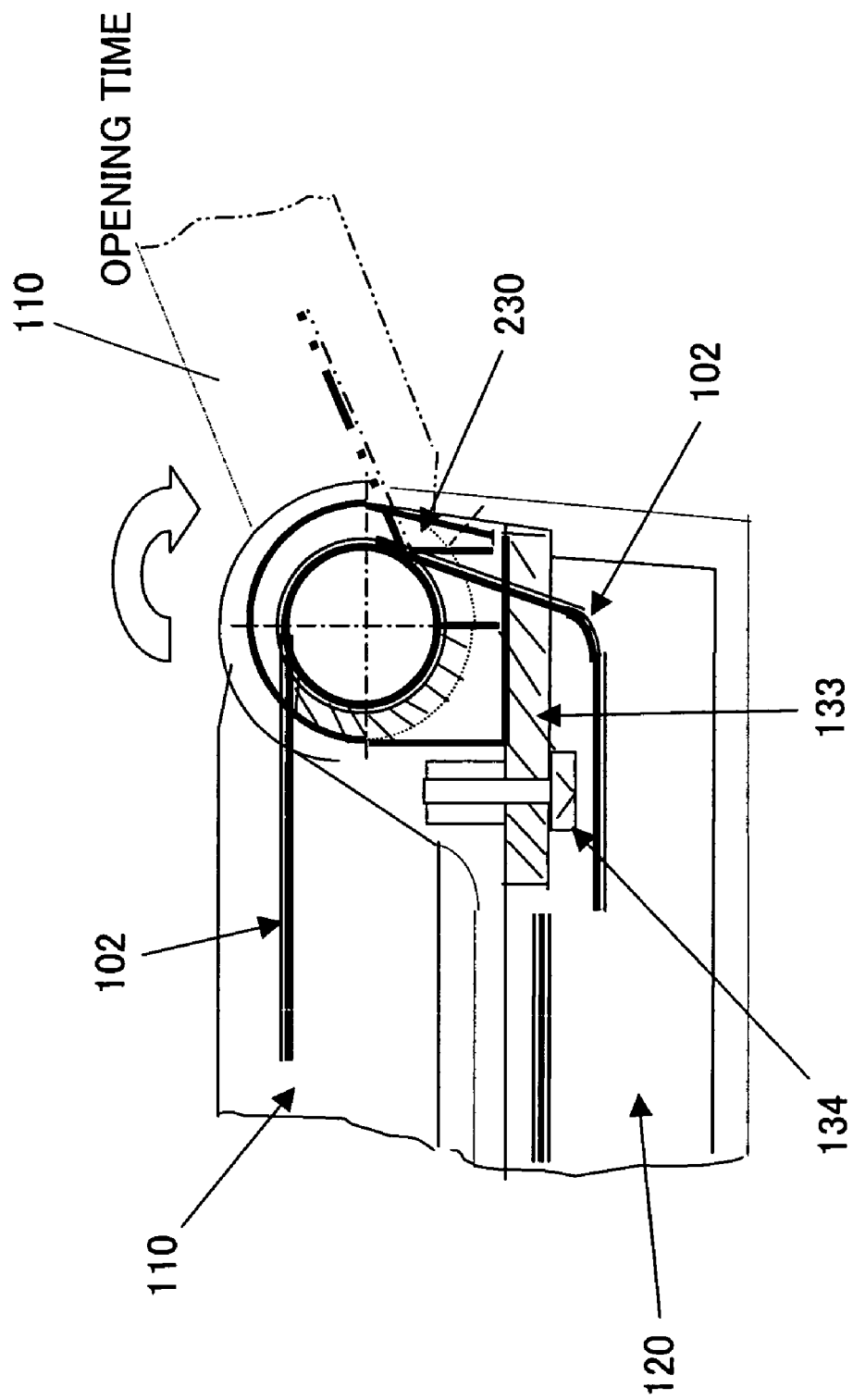
FIG. 18 is a schematic sectional view of FIG. 17.

The FPCB 102 connects a substrate (not shown) for an LCD screen 112 housed in the movable-side housing 110, and a substrate (not shown) for the ten-key 122 housed in the fixed-side housing 120, and coats plural parallel signal lines with an insulated elastic material. The signal line and insulated elastic material can use any technology known in the art, and a detailed description thereof will be omitted. The NFPCB includes the coaxial cable for the antenna, and the power cable. This embodiment winds the FPCB 102 around the shaft 214 of the damper 210 and the bearing 232 of the damper bush 230, as shown in FIG. 17. Here, FIG. 17 is a schematic sectional view of the hinge part 130 for explaining the attachment of the FPCB 102. FIG. 18 shows a position at which the FPCB 102 is pulled out of the movable-side housing 110 into the fixed-side housing 120.

Figure 19:
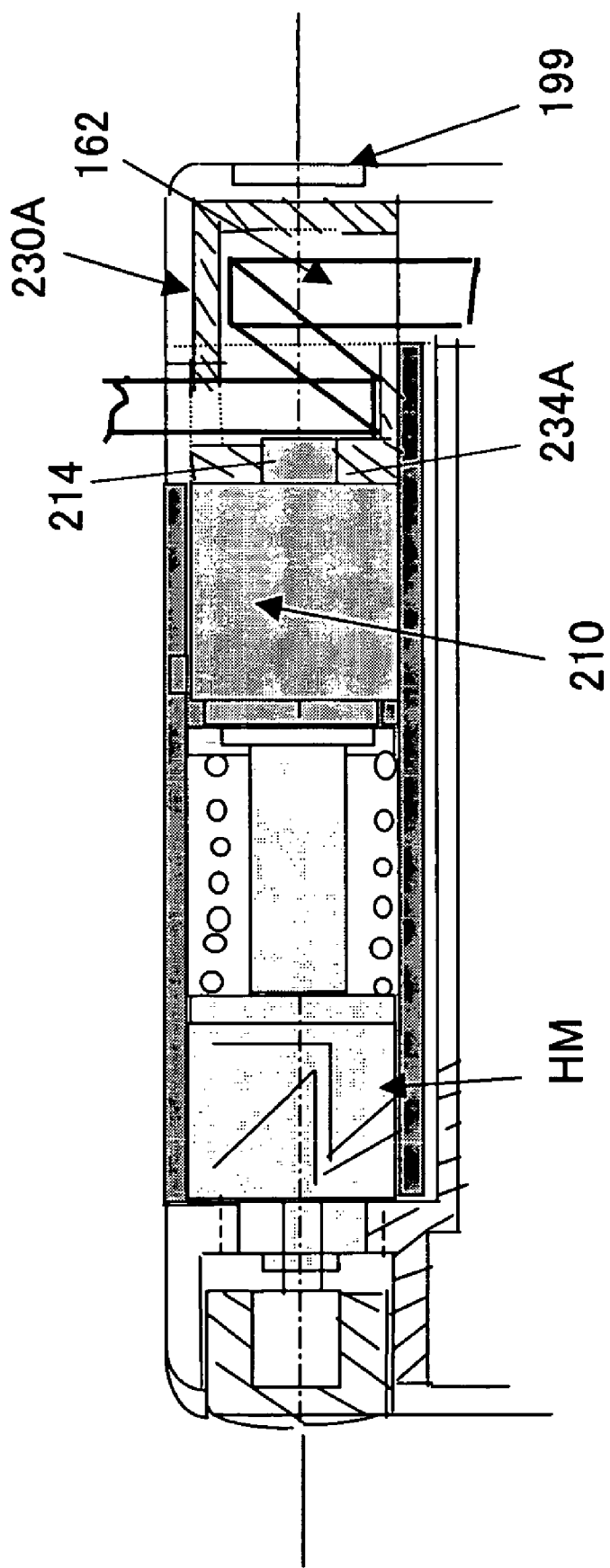
FIG. 19 is a schematic sectional view of a hinge part that includes a variation of a damper bush shown in FIGS. 4 and 17.

While the damper bush 230 shown in FIG. 17 has an illustrative fork-shaped section, it may have a hollow pillar shape, such as a hollow cylinder, a hollow square pillar, and a hollow triangular pillar. FIG. 19 shows this example. The damper bush 239A shown in FIG. 19 has a hollow cylindrical shape having a bearing 234A as a square perforation engageable with the square shaft 214 of the damper 210. The FPCB 102 passes through the hollow cylinder in the damper bush 230A. The bearing 234A may have a concave shape instead of the perforation.

Figure 20:
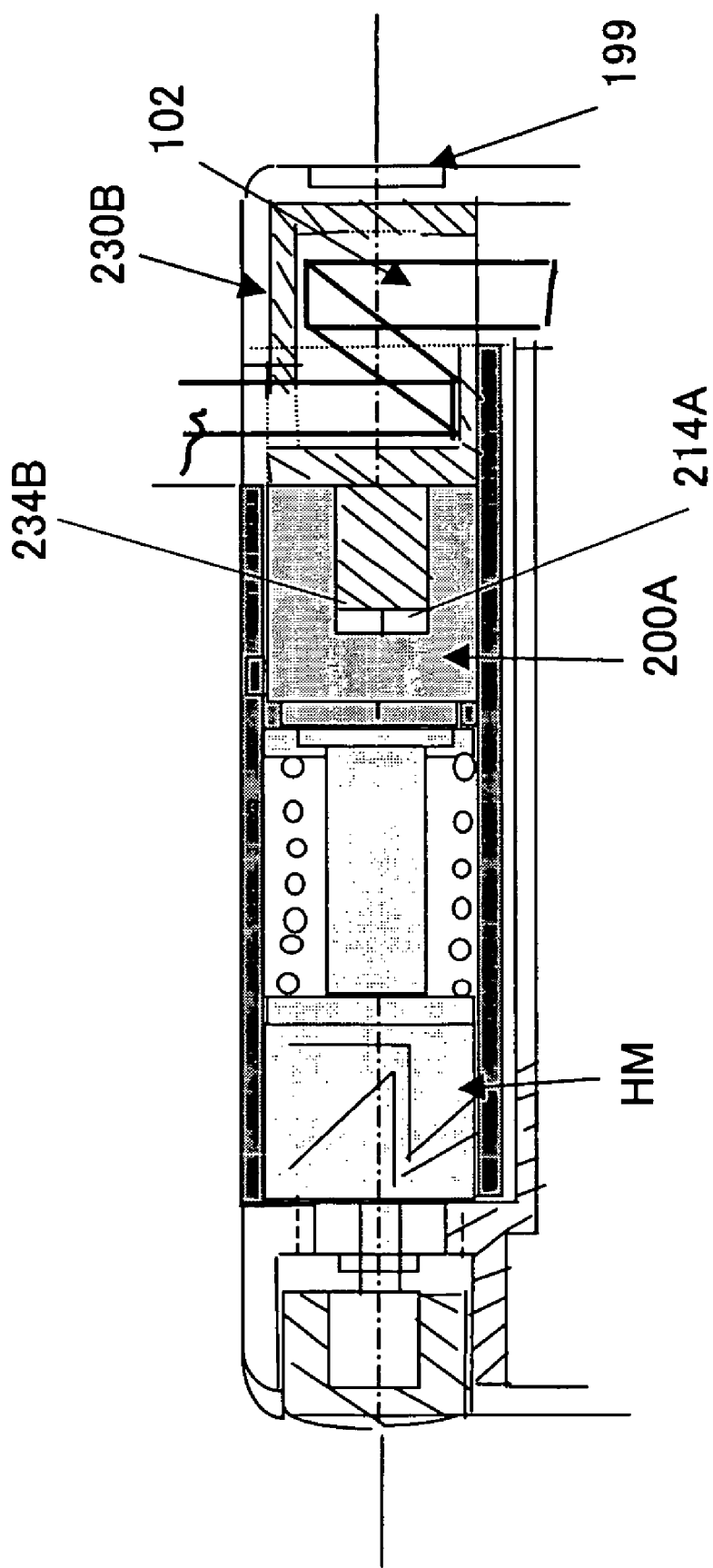
FIG. 20 is a schematic sectional view of a hinge part that includes a variation of a damper and the damper bush shown in FIG. 19.

The damper 210 shown in FIG. 19 has the convex shaft 214 and the damper bush 230A has the hole 234A, but the damper 210 may be replaced with a damper 210A having a concave shaft 214A and the damper bush 230A may be replaced with a damper bush 230B having a convex bearing 234B. FIG. 20 shows this example. An engagement relationship between the shaft 214A and the bearing 234B is similar to the above. Also similar to FIG. 19, the FPCB 102 passes through the hollow cylinder in the damper bush 230B.

Figure 21:
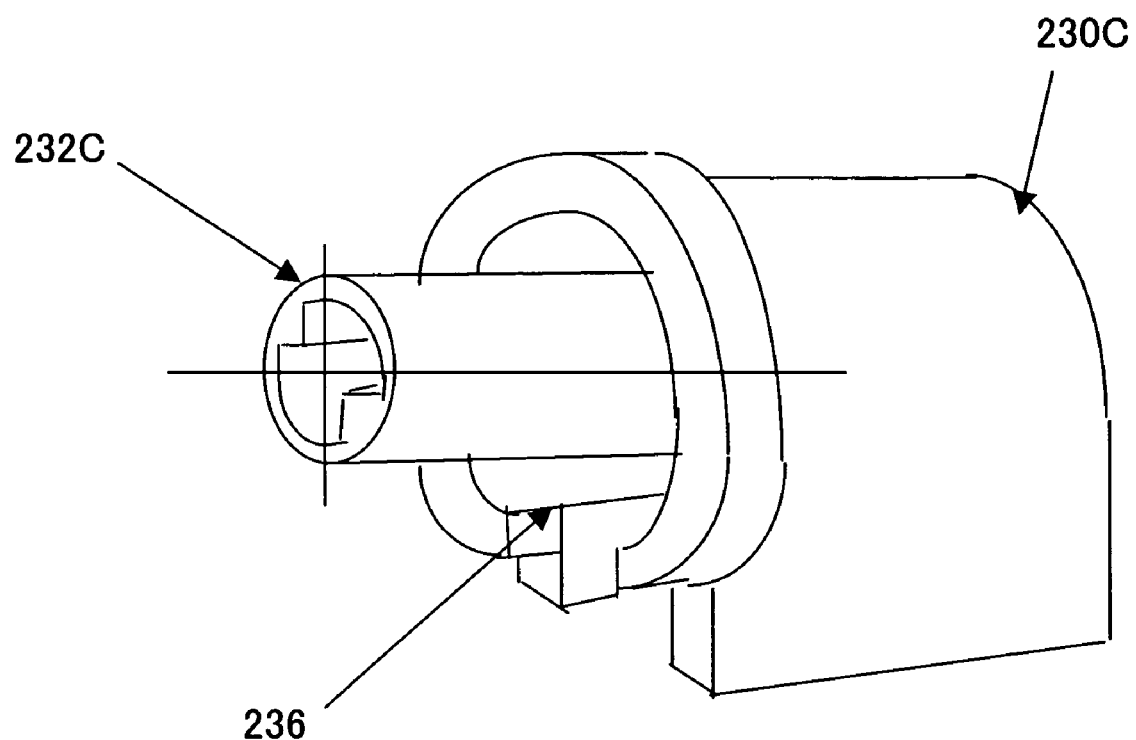
FIG. 21 is a schematic perspective view of another variation of the damper bush shown in FIG. 4.
Figure 23:
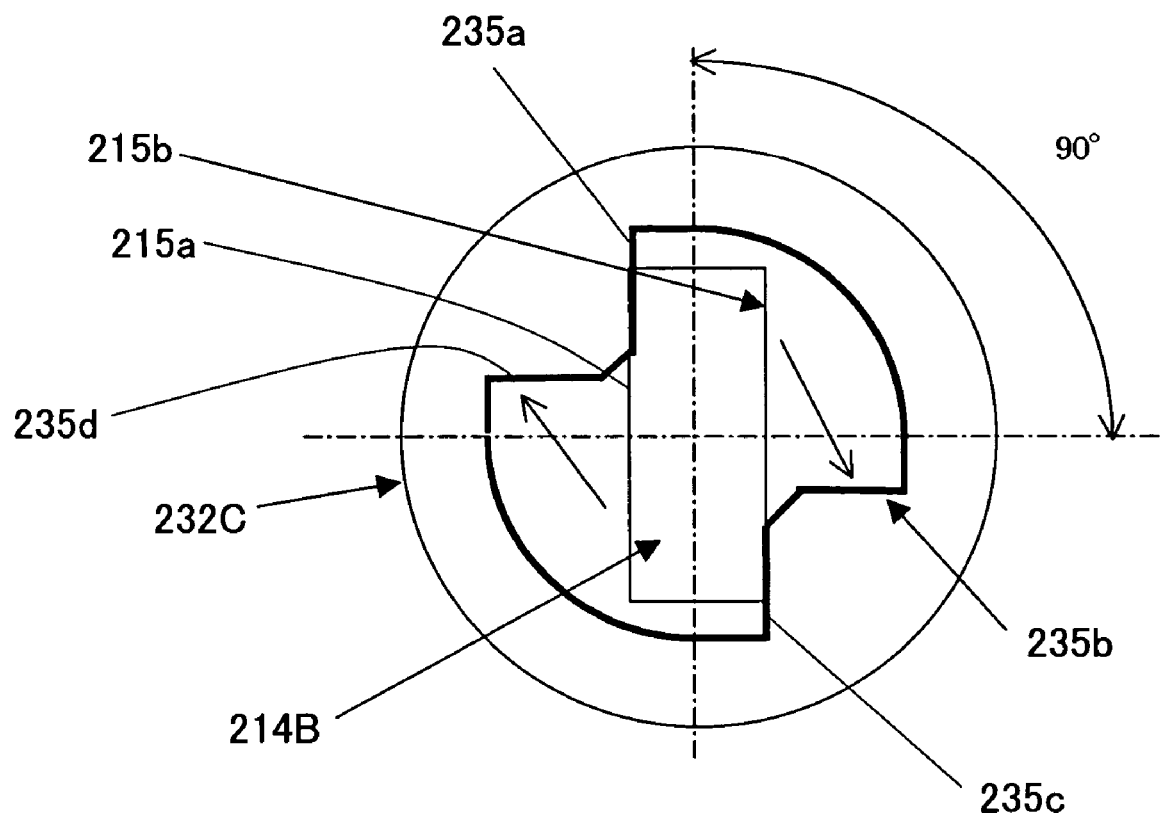
FIG. 23 is a plane view showing a relationship between the shaft of the damper shown in FIG. 22A and a bearing part shown in FIG. 22C when the damper effect acts.
Figure 24:
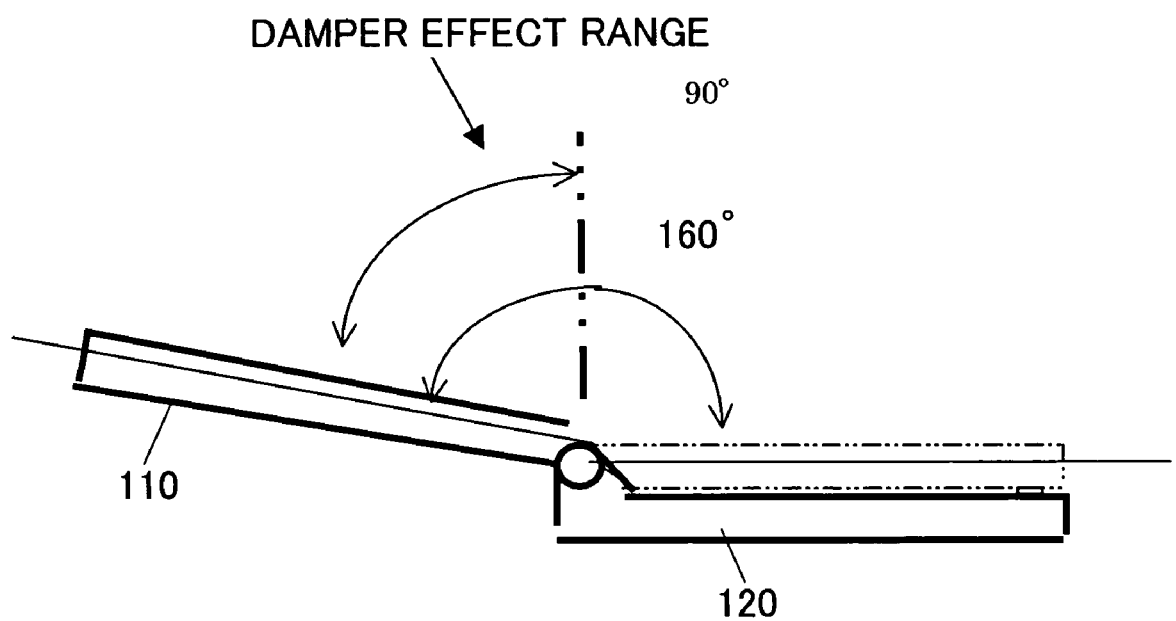
FIG. 24 is a schematic side view showing a range in which the damper effect acts when the damper and damper bush shown in FIGS. 21 and 23 are used.

The damper effect may act on part of the angular range in which the movable-side housing 110 opens. Referring now to FIGS. 21 to 24, a description will be given of this embodiment. Here, FIG. 21 is a schematic perspective view of the damper bush 230 as a variation of the damper bush 230. FIG. 22A is a schematic side view of a damper 210B as a variation of the damper 210. FIG. 22B is a schematic front view of the damper 210B. FIG. 22C is a schematic front view of a shaft 232C of the damper bush 230C. FIG. 22D is a schematic side view of the shaft 232C of the damper bush 230C. FIG. 22E is a schematic perspective view for explaining a connection between the damper 210B and the shaft 232C. FIG. 23 is a plane view showing a relationship between the shaft 214B of the damper 210B and a bearing part 232C when the damper effect acts. FIG. 24 is a schematic side view showing a range in which the damper effect acts when the damper 210B and damper bush 230C are used.

The damper bush 230C may have a shape similar to that of the damper bush 230, but is different from the damper bush 230 in having the shaft 232C having the bearing part 234C differently shaped from the bearing part 234. The bearing part 234 is a square groove, whereas the bearing part 234C has a shape that partially overlaps two sectors or quadrants having a central angle of 95° as shown in FIGS. 21, 22C and 23. In addition, while FIG. 21 shows that the damper bush 230C has an insertion opening 236 for the FPCB 102, the insertion opening 236 is also provided to the damper bush 230 while FIG. 4 omits it.

The damper 210B may have a shape similar to that of the damper 210, but is different from the damper 210 in having the shaft 214B differently shaped from the shaft 214. The shaft 214 has a square section, whereas the shaft 214B has a rectangular shape as shown in FIGS. 22A, B and E, and 23. While damper 210 uses the concave engagement part 212 for engagement with the fixed-side housing 120, the damper 210B uses a convex stopper 213. Of course, the dampers 210, 210A and 210B may have a concave shape, a convex shape, and another shape at the engagement part with the fixed-part housing 120. The damper 210B and the shaft 232C of the damper bush 230C are engaged with each other as shown in FIG. 22E.

As shown in FIG. 23, the bearing 214B is arranged in the bearing 234C, and the shaft 214B can freely rotate clockwise in the bearing part 234C within a range of 90° from a state at which the surface 215a of the shaft 214B contacts the surface 235a of the bearing part 234C and the surface 215b of the shaft 214B contacts the surface 235c of the bearing part 234C to a state at which the surface 215a of the shaft 214B contacts the surface 235d of the bearing part 234C and the surface 215b of the shaft 214B contacts the surface 235b of the bearing part 234C. When the movable-side housing 110 rotates and the shaft 214A rotates clockwise in FIG. 20, this means that no damper effect acts when the movable-housing 110 has an opening angle from 0° to 90°. On the other hand, the clockwise rotation of the shaft 214B in the bearing part 234C is restricted when the surface 215a of the shaft 214B contacts the surface 235d of the bearing part 234C and the surface 215b of the shaft 214B contacts the surface 235b of the bearing part 234C. This means that the damper effect acts when the opening angle of the movable-side housing 110 is equal to or greater than 90°. FIG. 24 shows this principle.

The damper effect acts when the opening angle of the movable-side hosing 110 is equal to or greater than 90° in this embodiment. Typically, a user holds the fixed-side housing 120 on his left palm and presses the press button 140. As a result, the movable-side housing 110 opens against the gravity force until its opening angle reaches 90° and the user receives a relatively small force during opening. On the other hand, when the opening angle of the movable-side housing 110 exceeds 90°, the movable-side hosing 110 opens with the aid of the gravity, the user receives a greater force, and the damper effect should act only in this range. In addition, the damper effect brakes the opening speed and the damper effect acting in an unnecessary range causes a long time opening and lowers the user's satisfaction to the opening. Of course, the present invention does not limit the damper effect working angle to 90° or greater, and may set the angle by considering the weight balance of the PDC 100, the demand for high-speed actions, and other conditions.

Figure 25:
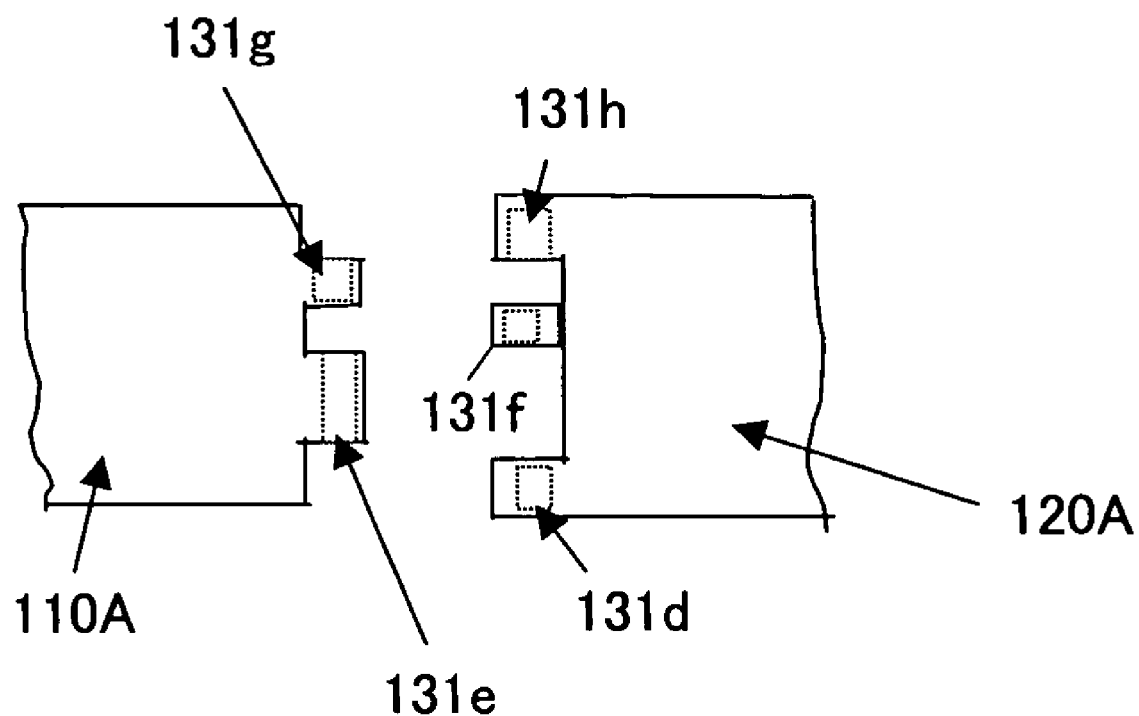
FIG. 25 is an exploded plane view of the five-section hinge part as a variation of the hinge part in the portable phone shown in FIG. 1.

Referring now to FIGS. 25 to 28, a description will be given of a hinge part 130A having a five-part structure as a variation of the hinge part 130 having a three-part structure. FIG. 25 is an exploded perspective view of the hinge part 130A. The hinge part 130A having the five-part structure includes, as shown in FIG. 25, convexes 131e and 131g at the movable-side housing 110 side, and convexes 131d, 131f and 131h at the fixed-side housing 120A. The movable-side housing 110A and the fixed-side housing 120A have similar functions as the movable-side housing 110 and the fixed-side housing 120 except for the structure of the hinge part 130A. The hinge part 130A houses a one touch opening mechanism, a free stop mechanism, and a damper mechanism 200D similar to the hinge part 130.

Figure 26:
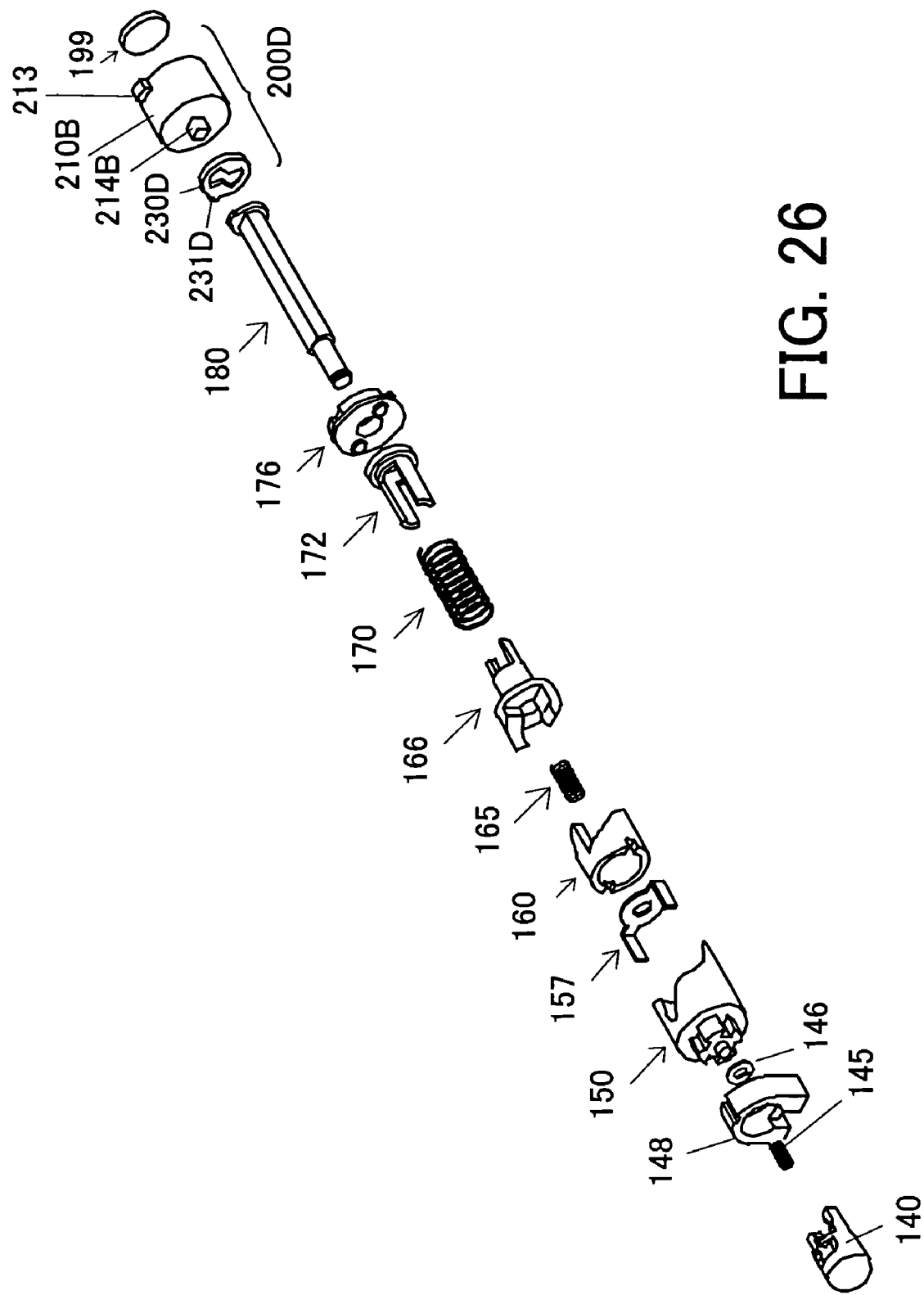
FIG. 26 is a schematic perspective view showing an illustrative structure of a mechanism applicable to the hinge structure in the portable phone shown in FIG. 25.

The hinge part 130A houses the mechanism shown in FIG. 26. Here, FIG. 26 is an exploded perspective view showing a structure of a mechanism housed in the hinge part 130A. Those elements in FIG. 26, which are the corresponding elements in FIG. 4, are designated by the same reference numerals, and a duplicate description thereof will be omitted. While the mechanism shown in FIG. 26 is a two-way manner, similar to FIG. 4, the present invention does not limit the hinge part 130A having the five-part structure to the two-way manner.

Referring to FIG. 26, the hinge part 130A includes the push button 140, the compression spring 145, the bush 148, the retaining ring 146, the outer cam 150, the lock 157, the inner cam 160, the compression spring 165, the counter cam 166, the compression spring 170, the free stop cams 172 and 176, the shaft 180, the damper mechanism 200D, and the cap 199. Therefore, the mechanism is similar to that shown in FIG. 4 other than the damper mechanism 200D. The members from the push button 140 to the retaining ring 146 are housed in the convex 131d, and the bush 148 is housed in the convex 131d. The members from the outer cam 150 to the shaft 180 are housed in the convex 131e. The FPCB 102 is inserted into the convexes 131f and 131g. The damper mechanism 200D and cap 199 are installed into the convex 131h.

Figure 27:
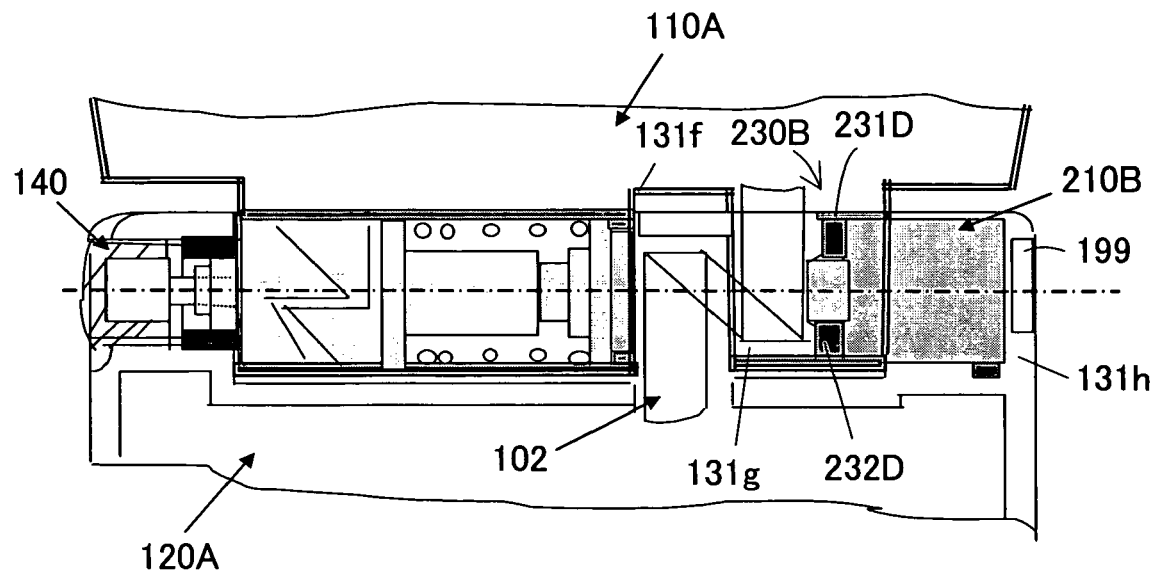
FIG. 27 is a schematic sectional view for explaining a structure to attach the flexible printed circuit board to the hinge part shown in FIG. 22.
Figure 28A:
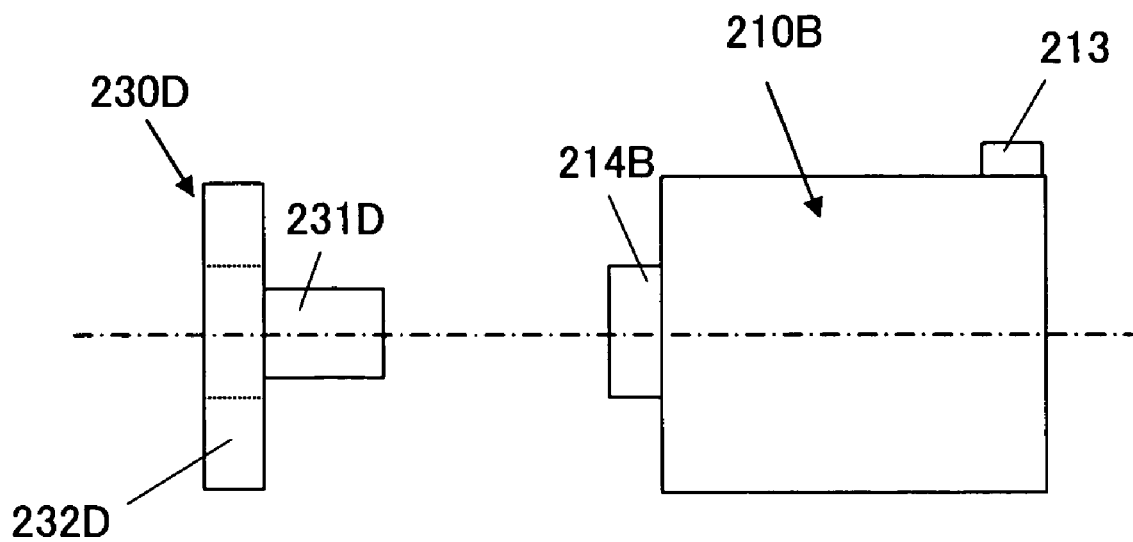
FIG. 28A is a side view of the damper mechanism shown in FIG. 27.
Figure 28B:
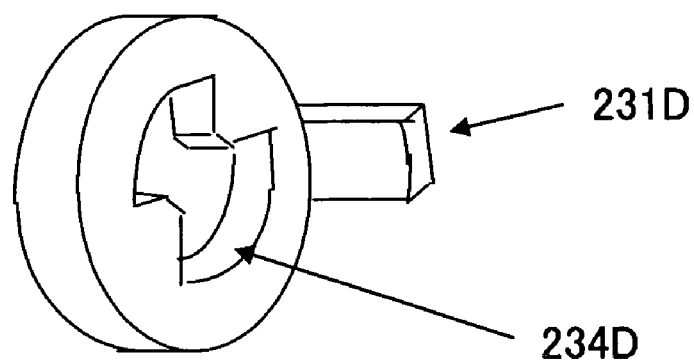
FIG. 28B is a perspective view of the damper bush shown in FIG. 27.

Referring now to FIGS. 27 and 28, a description will be given of the attachment of the FPCB 102 and the damper mechanism 200D. Here, FIG. 27 is a schematic sectional view for explaining the attachment of the FPCB 102 and the damper mechanism 200D to the hinge part 130A. FIG. 28A is a side view of the damper mechanism 200D, and FIG. 28B is a perspective view of the damper bush 230D.

The damper mechanism 200D of this embodiment has a damper 210B and a damper bush 230D shown in FIG. 22. An arrangement between the damper 210B and the damper bush 230D inverts to that of each of FIGS. 4 and 22, but may have the same arrangement. While this embodiment provides the damper 210B to the fixed-side housing 120A, the shaft 214B of the damper 210B may serve the shaft of the hinge part 130A. The damper bush 230D includes, as shown in FIG. 28B, a stopper or anti-rotation key 231D and a base 232D, and the base 232D is provided with a bearing part 234D similar to that shown in FIG. 23. Therefore, a relationship between the shaft 214B of the damper 210B and the bearing part 234D is quite similar to that in FIG. 23, and the damper effect acts in the range between 90° and 160°.

The FPCB 102 is folded back in the convex 131g and again folded back in the convex 131f.

Figure 29:
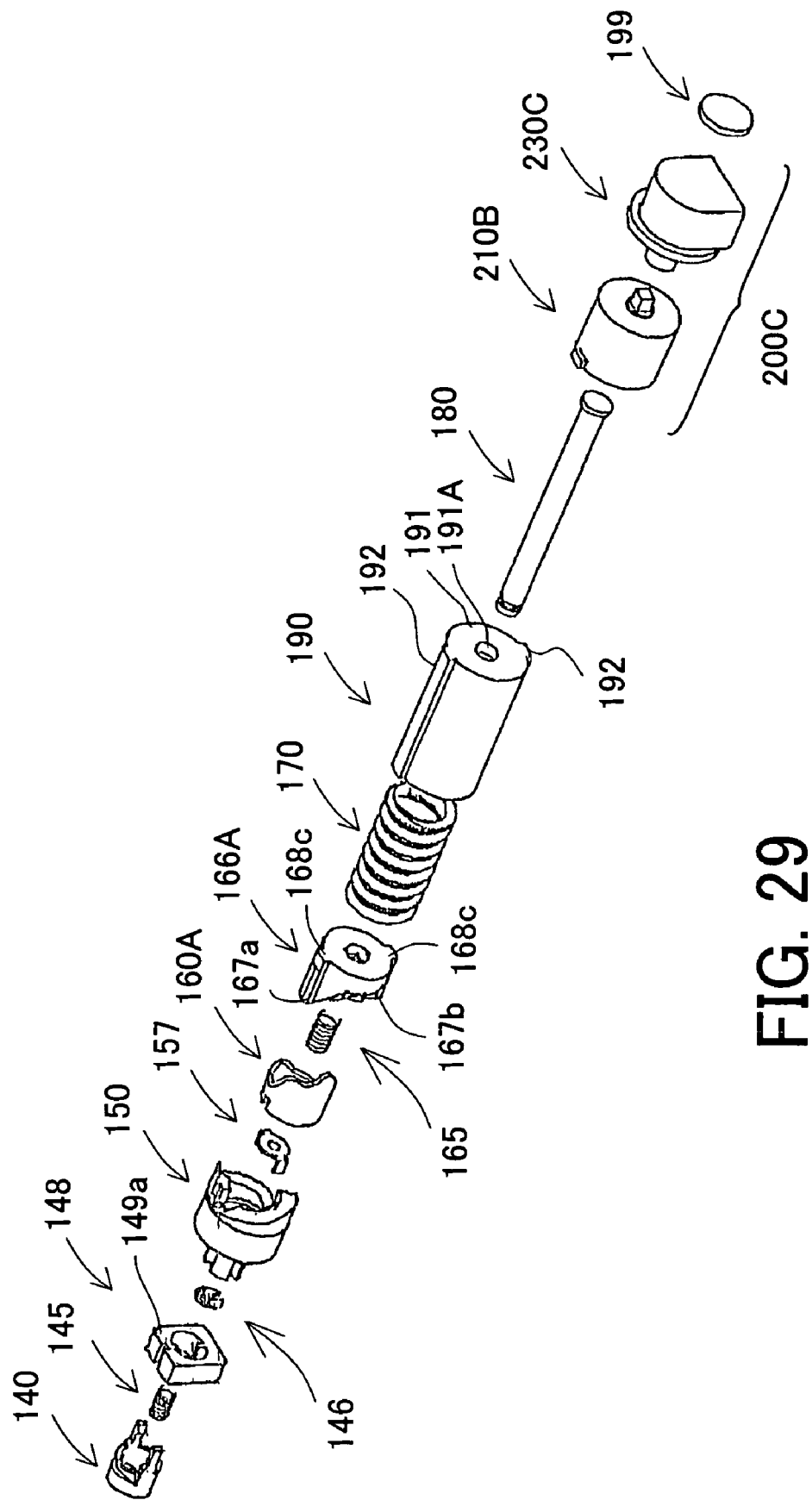
FIG. 29 is an exploded perspective view showing another illustrative structure of a mechanism applicable to the hinge part in the portable phone shown in FIG. 2.

Referring now to FIGS. 29 to 32, a description will be given of the one-way mechanism applicable to the hinge part 130 having the three-part structure. According to the "one-way manner" in the instant application, a press of the push button 140 opens the movable-side housing 110 up to about 160° in a non-stop motion and the free stop does not work when it is being closed. On the other hand, in manually opening the movable-side housing 110 from the closed state, the movable-side housing 110 opens to a predetermined angle in a non-stop motion and then the free stop function works. Here, FIG. 29 is an exploded perspective view of another structural example applicable to the hinge part 130. Those elements in FIG. 29, which are corresponding elements in FIG. 4, are designated by the same references, and a duplicate description thereof will be omitted.

Referring to FIG. 29, the hinge part 130 includes the push button 140, the compression spring 145, the bush 148, the retaining ring 146, the outer cam 150, the lock 157, an inner cam 160A, the compression spring 165, a counter cam 166A, the compression spring 170, a support 190, the shaft 180, a damper mechanism 200C and the cap 199. Those elements from the push button 140 to the retaining ring 146 are installed in the convex 131a at the side of the fixed-side housing 120, and the bush 148 is fixed onto the convex 131a. Those elements from the outer cam 150 to a damper 210B of the damper mechanism 200 are installed in the convex 131b of the hinge 130 at the side of the movable-side housing 110.

Those elements from the damper bush 230C and the cap 199 are installed in the convex 131c of the hinge part 130 at the side of the fixed-side housing 120.

Figure 30:
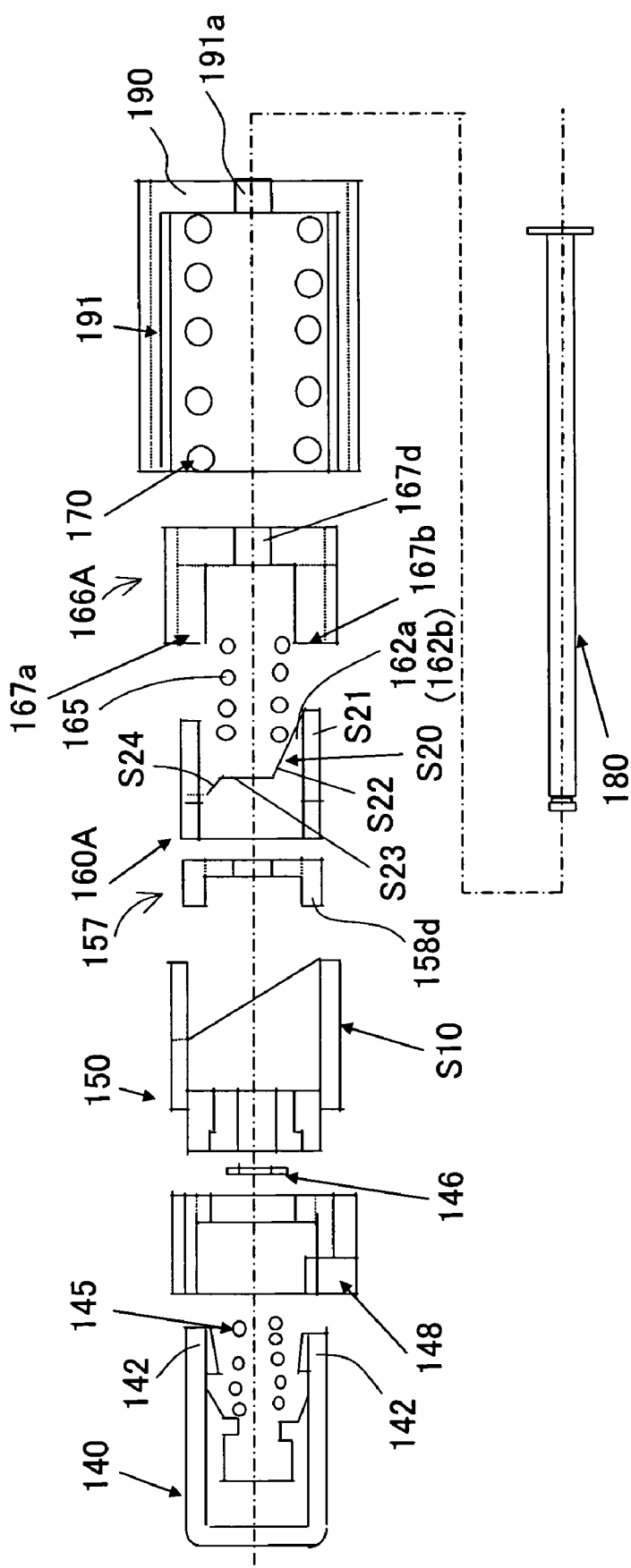
FIG. 30 is a schematic exploded sectional side view of the mechanism shown in FIG. 29.

Referring to FIG. 30, the hinge part 130 of the instant embodiment has the inner cam 160A, the counter cam 166A, and the support 190, which are different from that shown in FIG. 16. Here, FIG. 30 is a schematic exploded section of the part shown in FIG. 29. The inner cam 160A has a slide surface S20 for use with the free stop. S20 has inclined surfaces S21, S22, S24, and a flat surface S23. The counter cam 166A includes convexes 167a, 167b, a base 167c, and a pair of engagement parts 168c. The support 190 has a base 191 having a perforation 191a, and a pair of stoppers 192 that are engageable with the convex 131b of the hinge part 130, and accommodates the compression spring 170 and counter cam 166A. The engagement parts 168c are inserted into the stopper 192. The damper mechanism 200C includes the damper 210B and the damper bush 230C, which are described with reference to FIGS. 21 to 24.

The one touch opening mechanism is substantially the same as those shown in FIG. 4. In other words, the convexes 167a, 167b of the counter cam 166A are arranged as shown in FIGS. 10 and 11 relative to the outer cam 150 and the inner cam 160A before the push button 140 is pressed. When the push button 140 is pressed, the engagement nails 142 disengage the arms 158d of the lock 157 from the outer cam 150, and make rotatable the lock 157 and the inner cam 160A combined with the lock 157. The convexes 167a and 167b of the counter cam 166A compress the hills 162a, 162b (not shown) of the inner cam 160A, as discussed above, and rotate with the inner cam 160A by 180°, whereby the lock 157 and the outer cam 150 are engaged with each other again. The damper mechanism 200C acts the damper effect when the movable-side housing 110 has an opening angle of 90° or greater.

Figure 31:
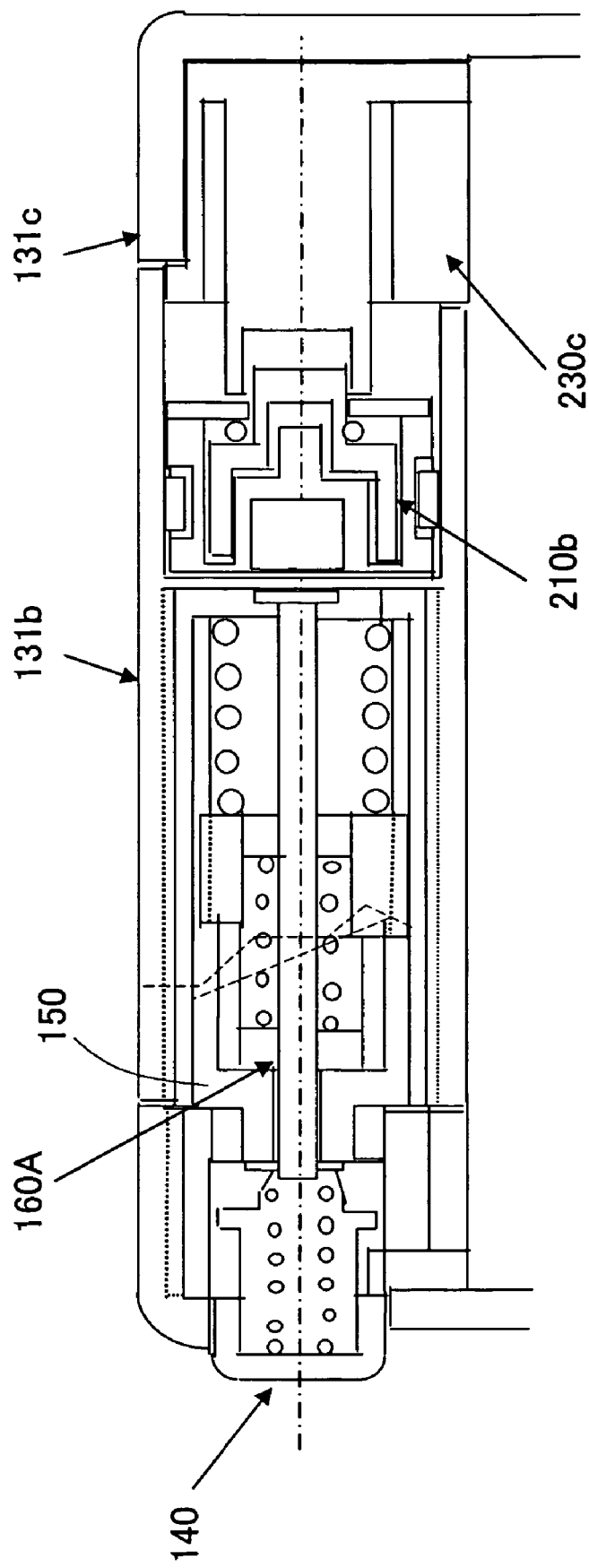
FIG. 31 is a schematic sectional view of the hinge part shown in FIG. 29 that includes the mechanism shown in FIG. 29.
Figure 32:
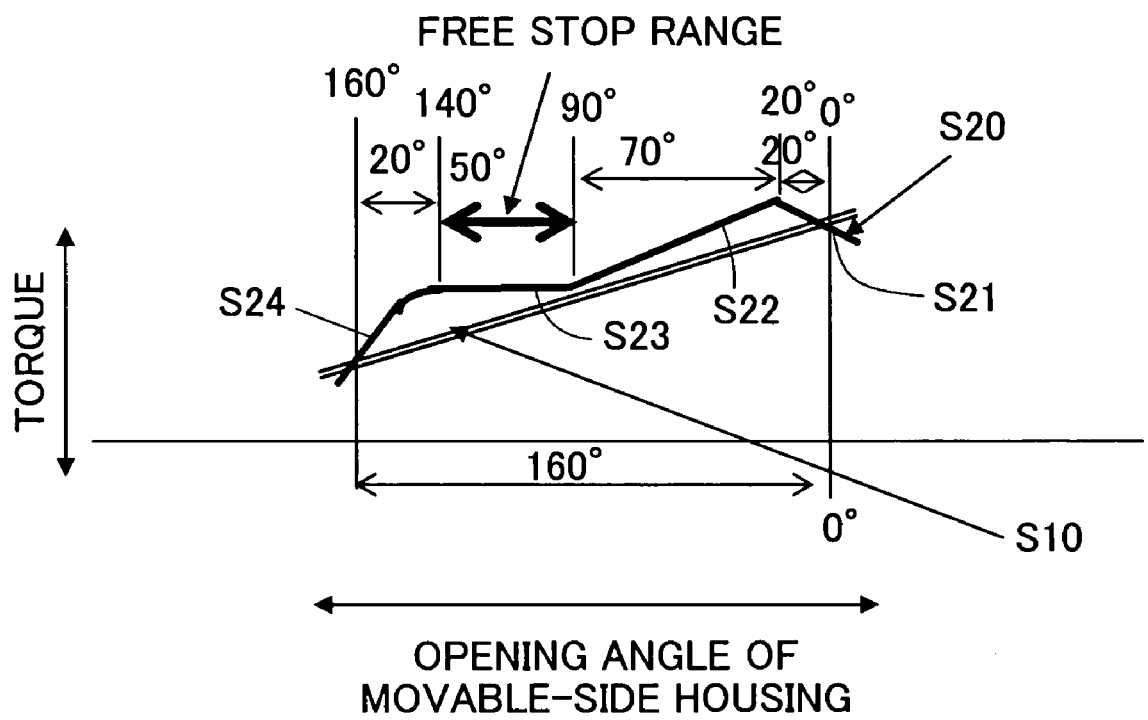
FIG. 32 is a graph showing a relationship between the one touch opening mechanism and the free stop mechanism shown in FIG. 29.

On the other hand, the free stop mechanisms shown in FIGS. 30 and 4 are different. As shown in FIGS. 31 and 32, the surface of the inner cam 160A is set higher than the inclined surface S10 of the outer cam 150 shown in FIG. 30 except for part of the inclined surface S21. Here, FIG. 31 is a schematic sectional view of the hinge part 130 that incorporates the part of the instant embodiment. FIG. 32 is a graph showing a relationship between the one touch opening mechanism and the free stop mechanism in the instant embodiment. As a result, as shown in FIG. 32, as the opening angle of the movable-side housing 110 increases from 0°, only the surface S20 of the inner cam 160A effects in an angular range where the inclined surface S21 exceeds the surface S10. As discussed with reference to FIGS. 10 and 11, the convexes 167a, 167b of the counter cam 166A are located at the dents between the hills 154a and 162a and between the hills 154b and 162b. Thus, the inclined surface S21 exceeds the surface S10, when the user manually moves the convexes 167a, 167b towards the hills 162a, 162b.

Referring to FIG. 32, when the user does not manually open the movable-side housing 110 beyond the surface S21 (or until the opening angle of the movable-side housing 110 reaches 20°), the counter cam 166A's convexes 167a and 167b return to the dents between the hills 154a and 162a and between the hills 154b and 162b. When the user manually opens the movable-side housing 110 beyond the surface S21, the movable-side housing 110 opens up to 90° in a non-stop motion along the inclined surface S22. This state does not generate a damper effect. When the opening angle of the movable-side housing 110 is between 90° and 140°, the counter cam 166A is subject to a compression force by the compression spring 170A, and the convexes 167a and 167b stand still at an arbitrary angle on the flat surface S23, activating the free stop function. A range where the free stop function works is adjustable by a range of the flat surface S23. When the opening angle of the movable-side housing 110 is between 140° and 160°, the convexes 167a and 167b move to the indents 162c, 162d along the inclined surface S24. A force resetting to 0° applies when the opening angle of the movable-side housing 110 is between 0° and 20°, whereas a force resetting to 160° when the opening angle of the movable-side housing 110 is between 140° and 160°.

Figure 33:
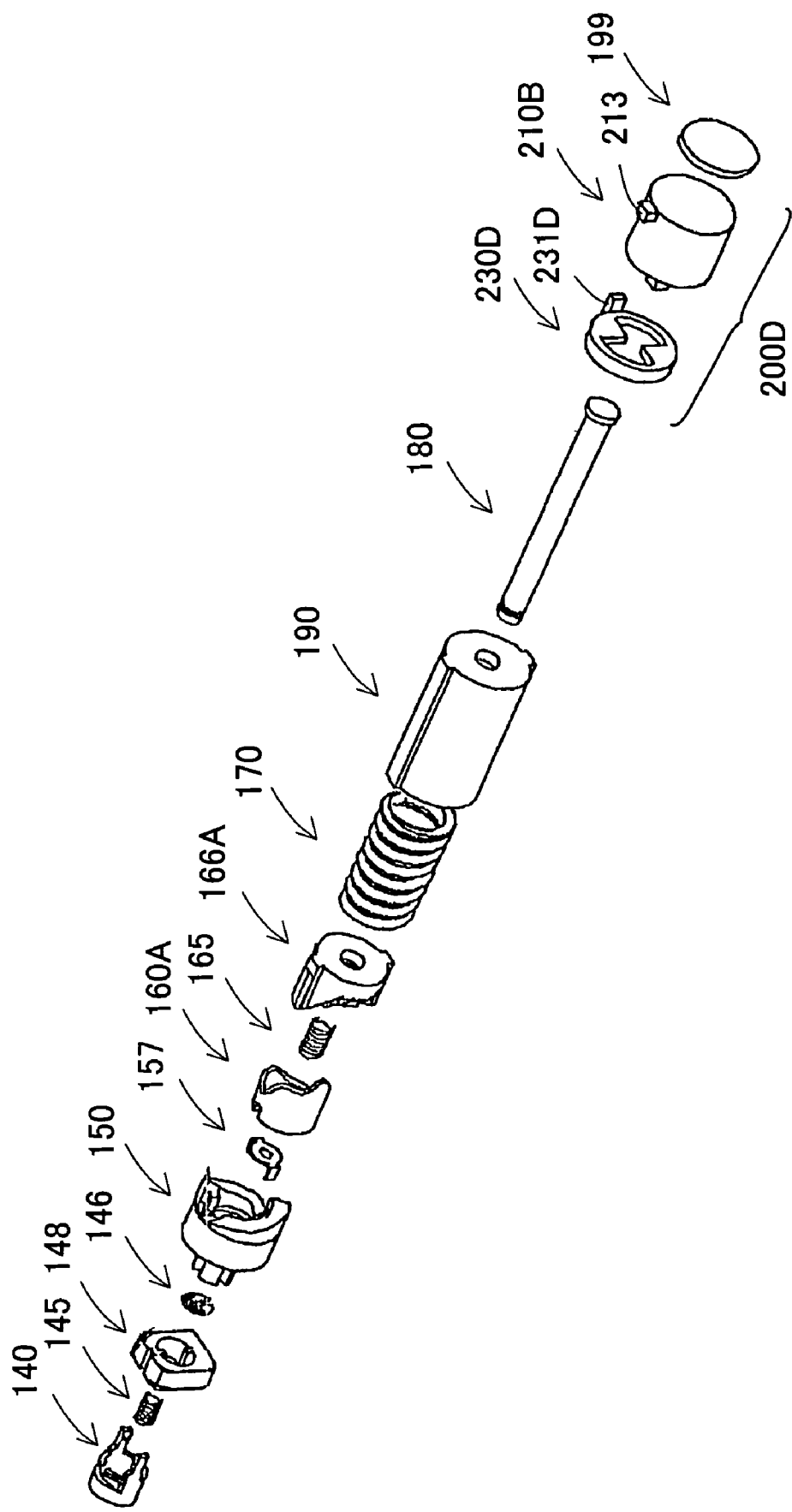
FIG. 33 is an exploded perspective view of another illustrative structure of the mechanism applicable to the hinge part in the portable phone shown in FIG. 25.

Referring now to FIG. 33, a description will be given of the one-way mechanism applicable to the five-part hinge part 130A. Here, FIG. 33 is an exploded perspective view showing a structure of the one-way mechanism housed in the hinge part 130A. Those elements in FIG. 33, which are the corresponding elements in FIGS. 26 and 29, are designated by the same reference numeral, and a duplicate description thereof will be omitted.

Referring to FIG. 33, the hinge part 130A includes the push button 140, the compression spring 145, the bush 148, the retaining ring 146, the outer cam 150, the lock 157, the inner cam 160A, the compression spring 165, the counter cam 166A, the compression spring 170, the support 190, the shaft 180, the damper mechanism 200D, and the cap 199. Those elements from the push button 140 to the retaining ring 146 are installed in the convex 131d, and the bush 148 is fixed onto the convex 131d. Those elements from the outer cam 150 to the shaft 180 are installed in the convex 131e. The FPCB 102 is inserted into the convexes 131f and 131g. The damper mechanism 200D and the cap 199 are installed in the convex 131h.

A description will now be given of operations of the inventive PDC 100.

A description will now be given of the PDC 100 when the three-part hinge part 130 has a mechanism shown in FIG. 4 or the five-part hinge part 130A has a mechanism shown in FIG. 26. Initially, the movable-side housing 110 is folded over the fixed-side housing 120.

In one touch opening, a user presses the push button 140. Then, the push button 140's engagement nails 142 are inserted into the outer cam 150's guide grooves 152, and disengage the arms 158d of the lock 157 from the guide grooves 152, unlocking the inner cam 160. The compression spring 170 applies the compression force to the convexes 167a, 167b of the counter cam 166 arranged on the inclined surface of the outer cam 150 in a downward direction on the inclined surface. Since the inner cam 160 is unlocked, the convexes 167a, 167b slide down to the indents 154c, 154d along the inclined surface on the outer cam 150 while pressing the inner cam 160. This movement and rotation of the counter cam 166 correspond to the best call angle of about 160°, and transmit to the free stop cam 176 that contacts the free stop cam 172 via the compression spring 170 with a predetermined contact force. The free stop cams 172 and 176 rotate together. As a result, the convex 131b fixed on the free stop cam 176 rotates with the free stop cam 176, and opens the movable-side housing 110 up to the best call angle in a non-stop motion or the movable-side housing 110 contacts the stopper 135, 137 or 138.

Since the damper 200 provides a damper effect, reduces the reaction at the opening time, and improves the safety. A damper effect in a limited angular range, like the damper 210B, shortens the open time. Since the movable-side housing 110 opens at the best call angle, a user immediately starts calling with improved operability.

In an attempt to manually close the movable-side housing 110 that has opened by the best call angle, the convex 131b and the free stop cam 176 rotate together. Since the compression spring 170 brings the free stop cam 172 into contact with the free stop cam 176, the free stop cam 172 rotates with the free stop cam 176 without free stop function. The free stop cam 172 is engaged with the counter cam 166 via the arms 173b and legs 168b, the rotational force of the free stop cam 172 transmits to the counter cam 166. Thereby, the convexes 167a, 167b of the counter cam 166 slide up on the inclined surface of the inner cam 160, and return to the state shown in FIG. 10.

When a user attempts to manually open the movable-side housing 110 from the initial state, the guide grooves 152 in the outer cam 150 are engaged with the arms 158d of the lock 157 and thus the inner cam 160 is locked. The convexes 167a, 167b of the counter cam 166 are locked at dents between the hills 154a and 154b of the outer cam 150 and the hills 162a and 162b of the inner cam 160. Therefore, the user's force is used to relatively rotate the free stop cams 172 and 176.

At an opening angle of the movable-side housing 110 between 0° and 20°, the projections 173d of the free stop cam 172 are located within the dimples 177b in the free stop cam 176, and the compression spring 170 applies a correction force to correct an angular shift between them. As a result, a torsion resetting force applies between the free stop cams 172 and 176, and the movable-side housing 110 is subject to a force resetting to 0°.

At an opening angle of the movable-side housing 110 between 20° and 140°, the projections 173d of the free stop cam 172 are located outside the dimples 177b in the free stop cam 176, and the free stop function maintains the projections 173d on the base 177's surface at an arbitrary angle under a compression (or contact) force of the compression spring 170. Thereby, a user can enjoy the Internet with the PDC 100 placed on the desk, and a camera function using the lens 119.

At an opening angle of the movable-side housing 110 between 140° and 160°, the projections 173d of the free stop cam 172 are located within the opposite dimples 177b in the free stop cam 176, and thus the compression spring 170 applies a correction force to correct an angular shift between them. As a result, a torsion resetting force applies to the free stop cams 172 and 176, and the movable-side housing 110 is subject to a force resetting to 160°. A user can feel a click at 160°. The damper effect works in the free stop action.

Figure 38:
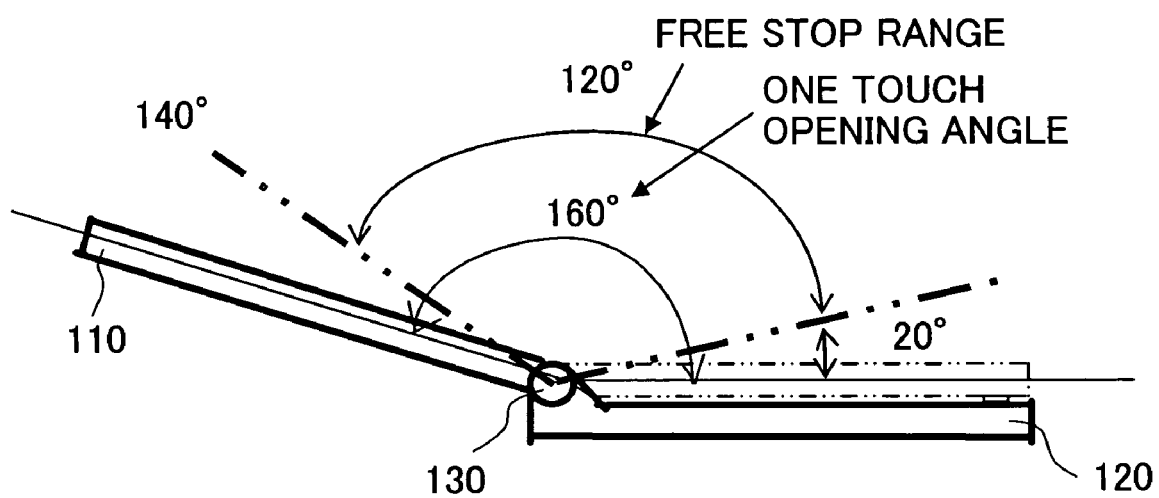
FIG. 38 is a schematic side view for explaining an effect of the mechanism shown in FIG. 4 or 26.

The movable-side housing 110 that has opened by 160° is manually closed in the similar manner to the above: At an opening angle of the movable-side housing 110 between 140° and 160°, the movable-side housing 110 is subject to a force resetting to 160°. The free stop function works at an opening angle of the movable-side housing 110 between 20° and 140°. At an opening angle of the movable-side housing 110 between 20° and 0°, the movable-side housing 110 is subject to a force resetting to 0°. A user can feel a click at 0°. FIG. 38 summarizes the above effects.

A description will now be given of the PDC 100 when the three-part hinge part 130 has a mechanism shown in FIG. 29 or the five-part hinge part 130A has a mechanism shown in FIG. 33. Initially, the movable-side housing 110 is folded over the fixed-side housing 120.

A one touch open action is similar to the above, and the counter cam 166A moves on the surface S10 of the outer cam 150 in FIG. 32. The damper 210B provides a damper effect at 90° or larger in this embodiment. In manually closing the movable-side housing 110 that has opened by the best call angle, a rotational force transmits from the movable-side housing 110 to the counter cam 166A via the stopper 192 and the engagement part 168c. Other than that, the structure is similar. For example, the counter cam 166A similarly slides up along the inclined surface of the inner cam 160A.

Suppose that a user attempts to manually open the movable-side housing 110 from the initial state. The guide grooves 152 in the outer cam 150 are engaged with the arms 158d of the lock 157, and the inner cam 160 is locked. The convexes 167a, 167b of the counter cam 166 are locked at dents between the hills 154a and 154b of the outer cam 150 and the hills 162a and 162b of the inner cam 160. When the user applies an additional force, the convexes 167a, 167b climb over the hills 162a and 162b of the inner cam 160. This state corresponds to a straight line S21 in FIG. 32.

At an opening angle of the movable-side housing 110 between 0° and 20°, the convexes 167a, 167b do not climb over the hills 162a and 162b of the inner cam 160 and the movable-side housing 110 is subject to a force resetting to 0°.

At an opening angle of the movable-side housing 110 between 20° and 90°, the convexes 167a, 167b climb over the hills 162a and 162b of the inner cam 160 and lead to non-stop opening. Such a state corresponds to a straight line S22 in FIG. 32. In this range, the movable-side housing 110 is subject to a force resetting to 90°, and the user can feel a click at 90°.

At an opening angle of the movable-side housing 110 between 90° and 140°, the convexes 167a, 167b are located on the flat surface S23 of the inner cam 160, and the free stop function maintains the convexes 167a, 167b on a surface of the base 177 at an arbitrary angle under a compression (or contact) force by the compression spring 170. Thereby, a user can enjoy the Internet with the PDC 100 placed on the desk, and a camera function using the lens 119. This state corresponds to a straight line S23 in FIG. 32.

At an opening angle of the movable-side housing 110 between 140° and 160°, the convexes 167a, 167b on the inclined surface S24 on the inner cam 160 provide non-stop opening. This state corresponds to the straight line S24 in FIG. 32. In this case, the damper 210b provides a damper effect. The user can feel a click at 160°.

Figure 39:
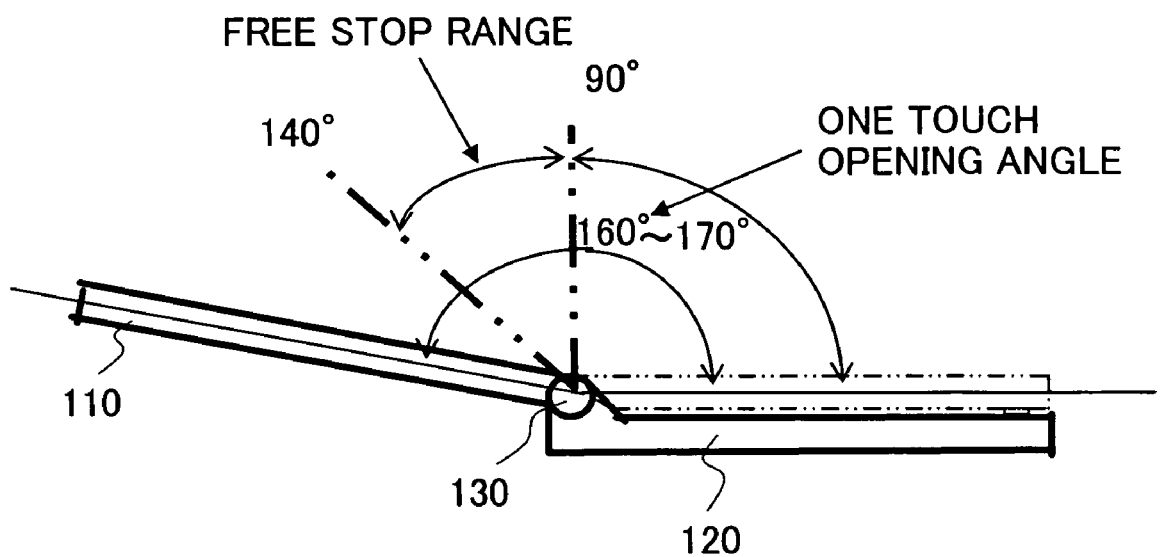
FIG. 39 is a schematic side view for explaining an effect of the mechanism shown in FIG. 29 or 33.

The movable-side housing 110 that has opened by 160° is manually closed in the manner similar to the above: At an opening angle of the movable-side housing 110 between 140° and 160°, the movable-side housing 110 is subject to a force resetting to 160°. A free stop function works at an opening angle of the movable-side housing 110 between 90° and 140°. At an opening angle of the movable-side housing 110 between 20° and 90°, the movable-side housing 110 is subject to a force resetting to 90°. At an opening angle of the movable-side housing 110 between 20° and 0°, the movable-side housing 110 is subject to a force resetting to 0°. The user can feel a click at 0°. FIG. 39 summarizes the above effects.

Further, the present invention is not limited to these preferred embodiments, and various variations and modifications may be made without departing from the scope of the present invention. For example, the present invention is not limited to a PDC, and is applicable to other mobile radio communication apparatuses.

Thus, the present invention can provide a mobile radio communication apparatus that improves operational comfortableness and safety for a call function and a secondary function (such as a camera function) as well as maintaining a miniaturization.

What is claimed is:

1. A mobile radio communication apparatus comprising:
   a first housing including an input part;
   a second housing including a speaker and a display;
   a hinge part that connects said second housing to said first housing so that said second housing can be folded over said first housing;
   a one touch opening mechanism that is provided to said hinge part, and automatically opens said second housing from a folded state to a first angle between 160° and 170° relative to said first housing in a non-stop motion;
   a damper mechanism that is provided to said hinge part and brakes an opening action of said second housing by said one touch opening mechanism, said damper mechanism including a damper and a damper bush, said damper having a rotational shaft that generates a braking power, and a damper bush having a fixed shaft connected to the rotational shaft; and
   a flexible printed circuit that is twisted around the rotational or fixed shaft of said damper mechanism, and electrically connects said first and second housings to each other.

2. A mobile radio communication apparatus according to claim 1, wherein said hinge part has a five-part structure that includes three first projections provided to said first housing, and two second projections provided to said second housing and among the first projections,
   wherein said mobile radio communication apparatus further comprises a flexible printed circuit that passes a middle of the three first projections and the second projection, and electrically connects to said first and second housings to each other.

3. A mobile radio communication apparatus comprising:
   a first housing including an input part;
   a second housing including a speaker and a display;
   a hinge part that connects said second housing to said first housing so that said second housing can be folded over said first housing;
   a one touch opening mechanism that is provided to said hinge part, and automatically opens said second housing from a folded state to a first angle between 160° and 170° relative to said first housing in a non-stop motion;
   a damper mechanism that is provided to said hinge part and brakes an opening action of said second housing by said one touch opening mechanism, said damper mechanism including a damper and a hollow damper bush, said damper having a rotational shaft that generates a braking power, and a damper bush having an engagement part engageable with the rotational shaft of the damper; and
   a flexible printed circuit that passes through a hollow in the damper bush, and electrically connects to said first and second housings to each other.

4. A mobile radio communication apparatus according to claim 3, further comprising a free stop mechanism that maintains said second housing relative to said first housing at a second angle,
   wherein said one touch opening mechanism, said damper mechanism and said free stop mechanism are provided to said hinge part.

5. A mobile radio communication apparatus comprising:
   a first housing including an input part;
   a second housing including a speaker and a display;
   a hinge part that connects said second housing to said first housing so that said second housing can be folded over said first housing;
   a one touch opening mechanism that automatically opens said second housing from a folded state to a first angle between 160° and 170° relative to said first housing in a non-stop motion;

a free stop mechanism that is provided to said hinge part at a side of said second housing and maintains said second housing relative to said first housing at a second angle; and a damper mechanism that is provided to said hinge part at a side of said second housing and brakes an opening action of said second housing by said one touch opening mechanism, wherein said one touch opening mechanism includes:

a cam that is provided to said hinge part at a side of said second housing, is fixed onto said first housing, and has an inclined surface;

a moving member that is provided to said hinge part at a side of said second housing, supported on the inclined surface of the cam, and forced to move and rotate along the inclined surface;

a push bottom that is provided to said hinge part at a side of said first housing;

an engagement member that is provided to said hinge part at a side of said second housing, and engaged with the cam to that the engagement member can be disengaged with the cam by said push button; and a restricting member that is provided to said hinge part at a side of said second housing, is engaged with said engagement member, and prevents said moving member from moving along the inclined surface of the cam, said restricting member rotating with the moving member when the push button releases an engagement between the engagement member and the cam.

6. A hinge unit for a mobile radio communication apparatus that includes a first housing including an input part, a second housing including a speaker and a display, and a flexible printed circuit that electrically connects to said first and second housings to each other, said hinge unit connecting the second housing to the first housing so that the second housing can be folded over the first housing, and said hinge unit comprising:

a one touch opening mechanism that automatically opens said second housing from a folded state to a first angle between 160° and 170° relative to said first housing in a non-stop motion; and a damper mechanism that brakes an opening action of said second housing by said one touch opening mechanism, said damper mechanism including a damper and a damper bush, said damper having a rotational shaft that generates a braking power, and a damper bush having a fixed shaft connected to the rotational shaft, wherein the flexible printed circuit is twisted around the rotational or fixed shaft of said damper mechanism.

7. A mobile radio communication apparatus according to claim 5, wherein the second angle is between 20° and 140°.

* * * * *